US008775234B2

(12) United States Patent
Jackness et al.

(10) Patent No.: US 8,775,234 B2
(45) Date of Patent: Jul. 8, 2014

(54) SALES FORCE AUTOMATION SYSTEM WITH FOCUSED ACCOUNT CALLING TOOL

(75) Inventors: Jeffrey Jackness, Cumming, GA (US); Douglas Kendall Sutton, San Antonio, TX (US)

(73) Assignee: Ziti Technologies Limited Liability Company, Dover, DE (US)

( * ) Notice: Subject to any disclaimer, the term of this patent is extended or adjusted under 35 U.S.C. 154(b) by 1860 days.

(21) Appl. No.: 11/633,251

(22) Filed: Dec. 4, 2006

(65) Prior Publication Data

US 2007/0282650 A1 Dec. 6, 2007

Related U.S. Application Data

(60) Provisional application No. 60/811,359, filed on Jun. 5, 2006.

(51) Int. Cl.
*G06Q 10/00* (2012.01)
*G06Q 10/06* (2012.01)
*G06Q 30/02* (2012.01)

(52) U.S. Cl.
CPC ...... *G06Q 10/06398* (2013.01); *G06Q 10/0637* (2013.01); *G06Q 10/0639* (2013.01); *G06Q 10/06393* (2013.01); *G06Q 30/0201* (2013.01)
USPC ....... 705/7.42; 705/7.36; 705/7.38; 705/7.39; 705/7.29

(58) Field of Classification Search
CPC ............................................. G06Q 10/06398
See application file for complete search history.

(56) References Cited

U.S. PATENT DOCUMENTS

| | | | | |
|---|---|---|---|---|
| 6,662,164 | B1 * | 12/2003 | Koppelman et al. | 705/14.13 |
| 6,760,727 | B1 * | 7/2004 | Schroeder et al. | 1/1 |
| 6,820,060 | B1 * | 11/2004 | Eisner | 705/7.31 |
| 6,871,232 | B2 * | 3/2005 | Curie et al. | 709/225 |
| 6,963,826 | B2 * | 11/2005 | Hanaman et al. | 703/2 |

(Continued)

FOREIGN PATENT DOCUMENTS

EP 1 244 042 A1 9/2002

OTHER PUBLICATIONS

ACT! by Sage Premium for Workgroups 2007 (9.0). Sage Software SB, Inc. Release Sep. 2006. 1-338.*

(Continued)

*Primary Examiner* — Brett Feeney
(74) *Attorney, Agent, or Firm* — Knobbe Martens Olson & Bear LLP

(57) ABSTRACT

A sales force automation method (30), comprises providing instructions which operatively direct a computer system (100) to employ one or more predetermined input-parameters (60), wherein each input-parameter is applicable to one or more clients. Sets of input-values are operatively sorted to the input-parameters for a corresponding, individual client, and the input-values that pertain to a selected client-set (62) are operatively gathered. The computer system sorts the input-values from the client-set according to sales-parameters (64) that pertain to the selected client-set. The sorted input-values are compiled and analyzed to generate an actual sales-performance-value (84) for each sales-parameter. Upon a comparison between the sales-performance-value for a sales-parameter and a corresponding parameter-target-value or target-range, the computer system can determine an appropriate sales performance-rating. Upon such determination of the sales performance-rating, the computer system can be operatively directed to display a graphical indicator (68) that corresponds to the sales performance-rating.

18 Claims, 12 Drawing Sheets

(56) References Cited

U.S. PATENT DOCUMENTS

| | | | | |
|---|---|---|---|---|
| 7,155,424 | B2* | 12/2006 | Ikezawa et al. | 1/1 |
| 7,266,508 | B1* | 9/2007 | Owen et al. | 705/7.13 |
| 7,328,186 | B2* | 2/2008 | Brattain et al. | 705/37 |
| 7,340,410 | B1* | 3/2008 | Vaillancourt et al. | 705/7.15 |
| 7,343,453 | B2* | 3/2008 | Prahlad et al. | 711/117 |
| 7,412,402 | B2* | 8/2008 | Cooper | 705/7.42 |
| 7,430,410 | B2* | 9/2008 | Iwatsu et al. | 455/414.1 |
| 7,461,020 | B2* | 12/2008 | Kemper et al. | 705/35 |
| 7,487,117 | B1* | 2/2009 | Tamura et al. | 705/26.5 |
| 7,533,037 | B1* | 5/2009 | Noble et al. | 705/7.31 |
| 7,542,917 | B2* | 6/2009 | Tsai | 705/7.38 |
| 7,584,115 | B2* | 9/2009 | Sahagian | 705/7.29 |
| 7,620,564 | B1* | 11/2009 | Lippock | 705/7.29 |
| 7,747,545 | B2* | 6/2010 | Gleim et al. | 706/8 |
| 7,831,465 | B2* | 11/2010 | Hoff | 705/7.31 |
| 2002/0046085 | A1 | 4/2002 | Rochon et al. | 705/14 |
| 2002/0072954 | A1* | 6/2002 | Sales | 705/10 |
| 2002/0188535 | A1* | 12/2002 | Chao et al. | 705/35 |
| 2003/0009373 | A1* | 1/2003 | Ensing et al. | 705/10 |
| 2003/0009536 | A1* | 1/2003 | Henderson et al. | 709/219 |
| 2003/0050825 | A1* | 3/2003 | Gallivan et al. | 705/10 |
| 2003/0069773 | A1* | 4/2003 | Hladik et al. | 705/7 |
| 2003/0158749 | A1* | 8/2003 | Olchanski et al. | 705/2 |
| 2003/0208468 | A1* | 11/2003 | McNab et al. | 707/1 |
| 2004/0039640 | A1* | 2/2004 | Koppelman et al. | 705/14 |
| 2004/0093276 | A1* | 5/2004 | Nishio | 705/26 |
| 2004/0128185 | A1* | 7/2004 | Tsai | 705/10 |
| 2004/0193503 | A1* | 9/2004 | Eder | 705/26 |
| 2004/0210475 | A1* | 10/2004 | Starnes et al. | 705/11 |
| 2005/0065756 | A1* | 3/2005 | Hanaman et al. | 703/2 |
| 2005/0065925 | A1* | 3/2005 | Weissman et al. | 707/4 |
| 2005/0096973 | A1* | 5/2005 | Heyse et al. | 705/11 |
| 2005/0108041 | A1* | 5/2005 | White | 705/1 |
| 2005/0223022 | A1* | 10/2005 | Weissman et al. | 707/102 |
| 2006/0059035 | A1* | 3/2006 | Kraft et al. | 705/10 |
| 2006/0085255 | A1* | 4/2006 | Hastings et al. | 705/14 |
| 2006/0233121 | A1* | 10/2006 | Cooper | 370/261 |
| 2006/0282432 | A1* | 12/2006 | Cassidy et al. | 707/7 |
| 2007/0027746 | A1* | 2/2007 | Grabowich | 705/10 |
| 2007/0100684 | A1* | 5/2007 | Gartner | 705/10 |
| 2007/0106674 | A1* | 5/2007 | Agrawal et al. | 707/10 |
| 2007/0192157 | A1* | 8/2007 | Gooch | 705/9 |
| 2007/0226032 | A1* | 9/2007 | White et al. | 705/9 |
| 2007/0283287 | A1* | 12/2007 | Taylor et al. | 715/769 |
| 2007/0299743 | A1* | 12/2007 | Staib et al. | 705/27 |
| 2008/0059309 | A1* | 3/2008 | Welch | 705/14 |
| 2008/0109426 | A1* | 5/2008 | Constantinides | 707/5 |
| 2008/0114712 | A1* | 5/2008 | Gleim et al. | 706/47 |
| 2008/0162487 | A1* | 7/2008 | Richter | 707/10 |
| 2008/0195429 | A1* | 8/2008 | Hoff | 705/7 |
| 2008/0319777 | A1* | 12/2008 | Hoff | 705/1 |

OTHER PUBLICATIONS

Case Management Implementation Guide (2005). Salesforce.com. 1-24.*

Sugar Open Source version 4.5 (2006). SUGARCRM. Sep. 6, 2006. 1-104.*

"ASP Introduction," W3Schools, Internet web page "http://www.w3schools.com/asp/asp_intro.asp", viewed and printed Aug. 28, 2006, pp. 1-3.

"Sales Force Automation," software by Salesforce.com available at Internet web page "http://www.salesforce.com/products/sales-force-automation.jsp" viewed and printed Jun. 1, 2006, pp. 1-2.

"Salesforce—Office & Outlook Editions," software by Salesforce.com available at Internet web page "http://www.salesforce.com/products/office.jsp" viewed and printed Jun. 1, 2006, pp. 1-2.

* cited by examiner

| Parameter | A | B | C | D |
|---|---|---|---|---|
| 1 | | | | (value) ("green") |
| 2 | | (value) ("yellow") | | (value) ("yellow") |
| 3 | | | (value) ("red") | (value) ("yellow") |
| 4 | (value) ("green") | | | (value) ("green") |

FIG. 4

Activities

FACT Metrics

| | Total Calls* | Total EU Calls* | Trial Rate* | Conversion Rate* | Plan Execution | | Target Account Focus | |
|---|---|---|---|---|---|---|---|---|
| | | | | | EU | Dist | EU | 'A' Dist |
| YTD | 16.2 (g) | 12.0 (y) | 26.4% (y) | 25.0% (g) | 8.7 (y) | 3.8 (g) | N/A | 92.2% (g) |
| 13 Wks. | 15.2 (y) | 11.4 (y) | 37.2% (g) | 38.5% (g) | 11.4 (g) | 3.8 (g) | N/A | 98.0% (g) |
| Last Wk. | 15.0 (y) | 11.0 (y) | 9.1% (r) | 81.8% (g) | 11.0 (g) | 4.0 (g) | N/A | 75.0% (y) |

"EU" = End User; "Dist" = Distributor

\* Links connect to running 13-week Scorecards for that metric.

--Roll cursor over the colored boxes to see the ranges defined for that metric

FIG. 5

Composite Assessment YTD

| | | | | | X (g) |
|---|---|---|---|---|---|
| Activities | Outstanding (g) | - | - | - | - |
| | Effective (y) | - | - | - | - |
| | Needs Improvement (r) | - | - | - | - |
| | Behind (r) | Progressing (y) | Achieving (g) | | |
| | | Results | | | |

FIG. 5A

"A" Distributor Scorecard for E

| YTD | All Volume | | ANR | | SC | | Distinctive Volume | |
|---|---|---|---|---|---|---|---|---|
| | Target | Actual | Target | Actual | Target | Actual | Target | Actual |
| Wipers | 5.3% | 2.9% (y) | 5.0% | 0.5% (y) | 4.8% | 1.2% (y) | 6.5% | 2.8% (y) |
| Washroom | 6.1% | 19.1% (g) | 5.7% | 28.7% (g) | 7.3% | 56.0% (g) | 10.2% | 20.8% (g) |
| Skin Care | 10.1% | 21.2% (g) | 17.4% | 23.8% (g) | 24.5% | 24.3% (y) | 17.7% | 20.9% (g) |
| Total | 5.8% | 16.5% (g) | 6.0% | 22.0% (g) | 7.8% | 36.8% (g) | 10.0% | 14.4% (g) |
| Full Year | All Volume | | ANR | | SC | | Distinctive Volume | |
| | Target | Actual | Target | Actual | Target | Actual | Target | Actual |
| Wipers | 5.3% | 6.2% (g) | 5.0% | 4.9% (y) | 4.8% | 5.5% (g) | 6.5% | 6.1% (y) |
| Washroom | 6.1% | 13.4% (g) | 5.7% | 22.5% (g) | 7.3% | 46.6% (g) | 10.2% | 16.9% (g) |
| Skin Care | 10.1% | 21.5% (g) | 17.4% | 23.0% (g) | 24.5% | 22.9% (y) | 17.7% | 21.1% (g) |
| Total | 5.8% | 12.5% (g) | 6.0% | 18.6% (g) | 7.8% | 32.5% (g) | 10.0% | 13.3% (g) |

"A" Distributor Scorecard for S

| YTD | All Volume | | ANR | | SC | | Distinctive Volume | |
|---|---|---|---|---|---|---|---|---|
| | Target | Actual | Target | Actual | Target | Actual | Target | Actual |
| Wipers | 5.3% | 1.7% (y) | 5.0% | 6.7% (g) | 4.8% | 8.5% (g) | 6.5% | 0.8% (y) |
| Washroom | 6.1% | 16.1% (g) | 5.7% | 19.9% (g) | 7.3% | 34.8% (g) | 10.2% | 27.7% (g) |
| Skin Care | 10.1% | 0.7% (y) | 17.4% | 3.5% (y) | 24.5% | 10.6% (y) | 17.7% | -2.2% (r) |
| Total | 5.8% | 13.9% (g) | 6.0% | 17.4% (g) | 7.8% | 28.4% (g) | 10.0% | 19.0% (g) |
| Full Year | All Volume | | ANR | | SC | | Distinctive Volume | |
| | Target | Actual | Target | Actual | Target | Actual | Target | Actual |
| Wipers | 5.3% | 1.6% (y) | 5.0% | 7.3% (g) | 4.8% | 9.7% (g) | 6.5% | 0.4% (y) |
| Washroom | 6.1% | 13.0% (g) | 5.7% | 17.5% (g) | 7.3% | 32.2% (g) | 10.2% | 26.3% (g) |
| Skin Care | 10.1% | 0.3% (r) | 17.4% | 1.9% (y) | 24.5% | 7.8% (y) | 17.7% | -3.5% (r) |
| Total | 5.8% | 11.2% (g) | 6.0% | 15.5% (g) | 7.8% | 26.6% (g) | 10.0% | 17.9% (g) |

FIG. 6

| District A | Per Seller Averages | | | |
|---|---|---|---|---|
| | District | | | N. Amer. |
| | Last Wk | 13 Wk | YTD | YTD |
| Total Calls | 16.0 (g) | 15.2 (y) | 14.1 (y) | 15.2 (y) |
| End User Calls | 11.4 (y) | 11.5 (y) | 11.1 (y) | 10.9 (y) |
| Trial Rate | 29.7% (y) | 29.6% (y) | 24.1% (r) | 29.6% (y) |
| Sales Conversion Rate | 28.6% (g) | 25.8% (g) | 23.4% (y) | 21.6% (y) |
| EU Calls Executed per Plan | 9.0 (g) | 8.7 (y) | 7.8 (y) | 7.2 (y) |
| Distr Calls Executed Per Plan | 3.9 (g) | 3.0 (y) | 2.3 (r) | 2.8 (r) |
| %Target EU Calls | n/a | n/a | n/a | n/a |
| %Strategic Distr. Calls | 78.4% (y) | 82.5% (g) | 69.6% (r) | 81.0% (g) |

"A" Distributor Scorecard for District A

| YTD | All Volume | | ANR | | | SC | | | Distinctive Volume | |
|---|---|---|---|---|---|---|---|---|---|---|
| | Target | Actual | Target | Actual | Target | Actual | Target | Actual | Target | Actual |
| Wipers | 5.3% | 7.0% (g) | 5.0% | 10.4% (g) | 4.8% | 10.1% (g) | 4.8% | 16.5% (g) | 6.5% | 4.8% (y) |
| Washroom | 6.1% | 12.8% (g) | 5.7% | 10.6% (g) | 7.3% | 9.4% (g) | 7.3% | 15.5% (g) | 10.2% | 11.9% (g) |
| Skin Care | 10.1% | 22.5% (g) | 17.4% | 25.7% (g) | 24.5% | 25.8% (g) | 24.5% | 29.1% (g) | 17.7% | 31.9% (g) |
| Total | 5.8% | 11.0% (g) | 6.0% | 11.1% (g) | 7.8% | 10.2% (g) | 7.8% | 16.3% (g) | 10.0% | 9.3% (y) |

| Full Year | All Volume | | ANR | | | SC | | | Distinctive Volume | |
|---|---|---|---|---|---|---|---|---|---|---|
| | Target | Actual | Target | Actual | Target | Actual | Target | Actual | Target | Actual |
| Wipers | 5.3% | 8.9% (g) | 5.0% | 14.9% (g) | 4.8% | 16.5% (g) | 4.8% | 16.5% (g) | 6.5% | 7.3% (g) |
| Washroom | 6.1% | 13.8% (g) | 5.7% | 14.3% (g) | 7.3% | 15.5% (g) | 7.3% | 15.5% (g) | 10.2% | 13.3% (g) |
| Skin Care | 10.1% | 22.4% (g) | 17.4% | 28.0% (g) | 24.5% | 29.1% (g) | 24.5% | 29.1% (g) | 17.7% | 32.6% (g) |
| Total | 5.8% | 12.2% (g) | 6.0% | 15.0% (g) | 7.8% | 16.3% (g) | 7.8% | 16.3% (g) | 10.0% | 11.2% (g) |

FIG. 7

| District B | Per Seller Averages | | | | | |
|---|---|---|---|---|---|---|
| | District | | | | N. Amer. | |
| | Last Wk | 13 Wk | YTD | | YTD | |
| Total Calls | 13.0 (y) | 14.3 (y) | 15.5 (y) | | 15.2 (y) | |
| End User Calls | 10.3 (y) | 11.0 (y) | 12.0 (g) | | 10.9 (y) | |
| Trial Rate | 38.7% (g) | 34.4% (y) | 31.4% (y) | | 29.6% (y) | |
| Sales Conversion Rate | 28.0% (g) | 26.5% (g) | 24.1% (y) | | 21.6% (y) | |
| EU Calls Executed per Plan | 7.1 (y) | 7.8 (y) | 8.9 (y) | | 7.2 (y) | |
| Distr Calls Executed Per Plan | 2.4 (r) | 2.8 (r) | 2.9 (r) | | 2.8 (r) | |
| %Target EU Calls | n/a | n/a | n/a | | n/a | |
| %Strategic Distr. Calls | 70.8% (y) | 80.9% (g) | 67.8% (r) | | 81.0% (g) | |

"A" Distributor Scorecard for District B

| YTD | All Volume | | ANR | | SC | | Distinctive Volume | |
|---|---|---|---|---|---|---|---|---|
| | Target | Actual | Target | Actual | Target | Actual | Target | Actual |
| Wipers | 5.3% | 15.6% (g) | 5.0% | 11.0% (g) | 4.8% | 10.6% (g) | 6.5% | 11.3% (g) |
| Washroom | 6.1% | -0.6% (r) | 5.7% | -2.6% (r) | 7.3% | 0.9% (y) | 10.2% | 17.9% (g) |
| Skin Care | 10.1% | -2.4% (r) | 17.4% | 1.9% (y) | 24.5% | 8.9% (y) | 17.7% | 6.3% (y) |
| Total | 5.8% | 0.9% (y) | 6.0% | -0.8% (r) | 7.8% | 2.9% (y) | 10.0% | 16.1% (g) |
| Full Year | All Volume | | ANR | | SC | | Distinctive Volume | |
| | Target | Actual | Target | Actual | Target | Actual | Target | Actual |
| Wipers | 5.3% | 16.3% (g) | 5.0% | 13.2% (g) | 4.8% | 12.2% (g) | 6.5% | 14.0% (g) |
| Washroom | 6.1% | 0.8% (y) | 5.7% | -0.5% (r) | 7.3% | 2.5% (y) | 10.2% | 17.6% (g) |
| Skin Care | 10.1% | -4.0% (r) | 17.4% | 0.6% (y) | 24.5% | 6.2% (y) | 17.7% | 6.6% (y) |
| Total | 5.8% | 2.2% (y) | 6.0% | 1.2% (y) | 7.8% | 4.3% (y) | 10.0% | 16.3% (g) |

FIG. 7A

| Date | Contact Name | Contact Type | Objective | Date Logged | Took Place? | Cancelled? | Outcome? | Reason? | Update Sales Call | Delete Acct. | Modify Acct. |
|---|---|---|---|---|---|---|---|---|---|---|---|
| Tuesday 1/3/2006 8:15:00 AM | - | Dis | DSR | 1/2/2006 4:42:55 PM | Yes | N/A | Objective Met | Other | Update Sales Call | N/A | N/A |
| Tuesday 1/3/2006 8:30:00 AM | - | ACT | ACR | 1/2/2006 4:52:25 PM | Yes | N/A | Sale of Product/ Bundle | Price | Update Sales Call | N/A | N/A |
| Comments: Wiper Call | | | | | | | | | | | |
| Tuesday 1/3/2006 10:30:00 AM | - | ACT | ACR | 1/2/2006 5:31:50 PM | Yes | N/A | Sale of Product/ Bundle | Price | Update Sales Call | N/A | N/A |
| Comments: Wiper Call | | | | | | | | | | | |
| Tuesday 1/3/2006 1:00:00 PM | - | ACT | ACR | 1/2/2006 5:37:25 PM | Yes | N/A | Sale of Product/ Bundle | Price | Update Sales Call | N/A | N/A |
| Comments: Wiper Call | | | | | | | | | | | |
| Wednesday 1/4/2006 8:00:00 AM | - | Dis | DSR | 1/2/2006 4:43:41 PM | Yes | N/A | Objective Met | Other | Update Sales Call | N/A | N/A |
| Wednesday 1/4/2006 2:00:00 PM | - | ACT | ACR | 1/2/2006 4:58:44 PM | Yes | N/A | | Price | Update Sales Call | Delete | Modify |

FIG. 8

Company X
1234 Easy Street
Salt Lake City, UT
New Sales Report (will open in a new window)
Place a sample or trial order   CustomerNet (will open in a new window)
Electronic Complaint Form
Create New PA Appointment Date: [Jan 4 2006 8:00 AM John Doe ▼]

Date: [1/5/2006] (mm/dd/yy)

Outcome: [Trial ▼]

Reason for Outcome?: [Price ▼]

Comments: [new biz potential]

Product Presentations: [50600] [05790] [◀▶]
(Product Code Only)

Trial? [☑]                    [ ]

Schedule Trial Follow-up:     [☐] [9:00 AM ▼] [1/2 Hour ▼]
Date/Time/Duration

Distributor: [Zacatecas Ultrananobiotech & Cleaning ▼]

Schedule New Appointment [☐] Check this box, if you wish to create another appt, upon saving, for this end user
Message to Cust Srv/Order [☐] (Not req'd. for trial follow-up)
Samples (Specify Cases ...

Done                                                                Local Intranet

FIG. 9

SALES FORCE AUTOMATION SYSTEM WITH FOCUSED ACCOUNT CALLING TOOL

CROSS-REFERENCE TO RELATED CASES

The present application claims the benefit of the prior, co-pending U.S. Provisional Patent Application Ser. No. 60/811,359 entitled SALES FORCE AUTOMATION SYSTEM WITH FOCUSED ACCOUNT CALLING TOOL by J. Jackness et al., which was filed Jun. 5, 2006, the entire disclosure of which is incorporated herein by reference in a manner that is consistent herewith.

FIELD OF USE

The present invention relates to a system for assisting or managing a sales operation. More particularly, the invention relates to a computerized method for assisting or managing a sales force.

BACKGROUND

Managing a sales force team poses numerous challenges to a business. Ensuring that sales force personnel are properly trained, focusing on key customers or other key clients, engaging in the right behaviors, or reaching sales targets can be a daunting task for a business, especially when sales force personnel are widely scattered across many locations. Many software tools, such as the Sales Force Automation suite of SalesForce.com, a business located in San Francisco, Calif., U.S.A. (see, for example, http://www.salesforce.com/products/sales-force-automation.jsp; as viewed Jun. 1, 2006). In addition, the tools of Sales Force Automation, Inc. (Carson City, Nev., U.S.A.), have been developed to address various aspects of sales force management or customer relationship management, and other tools have been produced for contact management, such as ACT! 2006 by Sage Software SB (Scottsdale, Ariz., U.S.A.). However, major shortcomings remain. Previous tools have typically been directed toward managing a territory or keeping track of information, but have not provided adequate coaching assistance or adequate ways for sales people to identify what they are doing well and what they are doing poorly. There remains a need for coaching and management tools that can better drive the behavior of sales force personnel to achieve success and fulfill corporate objectives. In particular, there remains a need for an improved system and technique which can better track behaviors associated with account calling, and can better relate the behaviors to predetermined success criteria.

SUMMARY

A sales force automation method, comprises providing instructions which operatively direct a computer system to employ one or more predetermined input-parameters, wherein each input-parameter is applicable to one or more clients. Sets of input-values are operatively sorted to the input-parameters for a corresponding, individual client, and the input-values that pertain to a selected client-set are operatively gathered. The computer system can sort the input-values from the client-set according to sales-parameters that pertain to the selected client-set, and the sorted input-values can be compiled and analyzed to generate a sales-performance-value for each sales-parameter. Upon a comparison between the sales-performance-value for a sales-parameter and a corresponding parameter-target-value or target-range, the computer system can determine an appropriate sales performance-rating. Upon such determination of the sales performance-rating, the computer system can be operatively directed to display a graphical indicator that corresponds to the sales performance-rating.

By incorporating its various features and aspects, alone or in selected combinations, the sales force automation system and method can provide desired benefits and improvements. The system and method can help sales force personnel focus their efforts on the highest priorities and monitor their own performance metrics. Sales calls and other events can be planned and targeted toward high-priority customers or clients and toward meeting key objectives. For example, the system and method can provide a planning guide that interacts with planning or scheduling tools to help schedule appointments, linking them with customer (or client) data and other information that are associated with the client and with the objectives for the client. Results of sales activities can be more quickly and efficiently reported, and the results can be more efficiently distributed and compared to planned objectives. Areas of desired improvement can be more readily identified, and appropriate attention and resources can be more efficiently directed to those areas. Accordingly, the system and method can allow management to better track, guide, and reward the efforts of the sales force. Shared systems and individual activities can all be brought together in the system and method. The system and method can also allow management to provide improved monitoring of performance, and more efficient training. In a particular aspect, a graphical indicator or performance scorecard feature can be used to quickly assess behavior and identify areas that need improvement. Activities and results can be more effectively mapped to established targets, and the graphical input can quickly show whether the performance exceeds, meets, or is below expectations.

BRIEF DESCRIPTION OF THE DRAWINGS

The invention will be better understood by reference to the following description of the invention taken in conjunction with the accompanying drawings, wherein:

FIG. 4 representatively shows a matrix-grid having selected sales-parameters and an array of matrix-cells that can display values and graphical indicators.

FIG. 5 representatively shows a screen shot of a portion of a scorecard system that can be employed with the sales force automation method.

FIG. 5A representatively shows a matrix-grid that employs a first, composite parameter and a second, composite parameter.

FIG. 6 representatively shows a screen shot of another portion of the scorecard system that can be employed with the sales force automation method.

FIG. 7 representatively shows still another portion of the scorecard system that has been extended to summary data sets that can cover multiple sales persons for one or more sales districts or groups.

FIG. 7A representatively shows a portion of the scorecard system that has been extended to summary data sets covering sales persons for another sales district or group.

FIG. 8 representatively shows a portion of a screen shot that can be employed in a scheduling system to display appointments for a particular sales person for a particular week.

FIG. 9 representatively shows a screen shot of a reporting system that can be employed with the sales force automation method to update a database for a hypothetical company.

Corresponding reference characters indicate corresponding parts throughout the drawings.

DETAILED DESCRIPTION

It should also be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Figure 1:
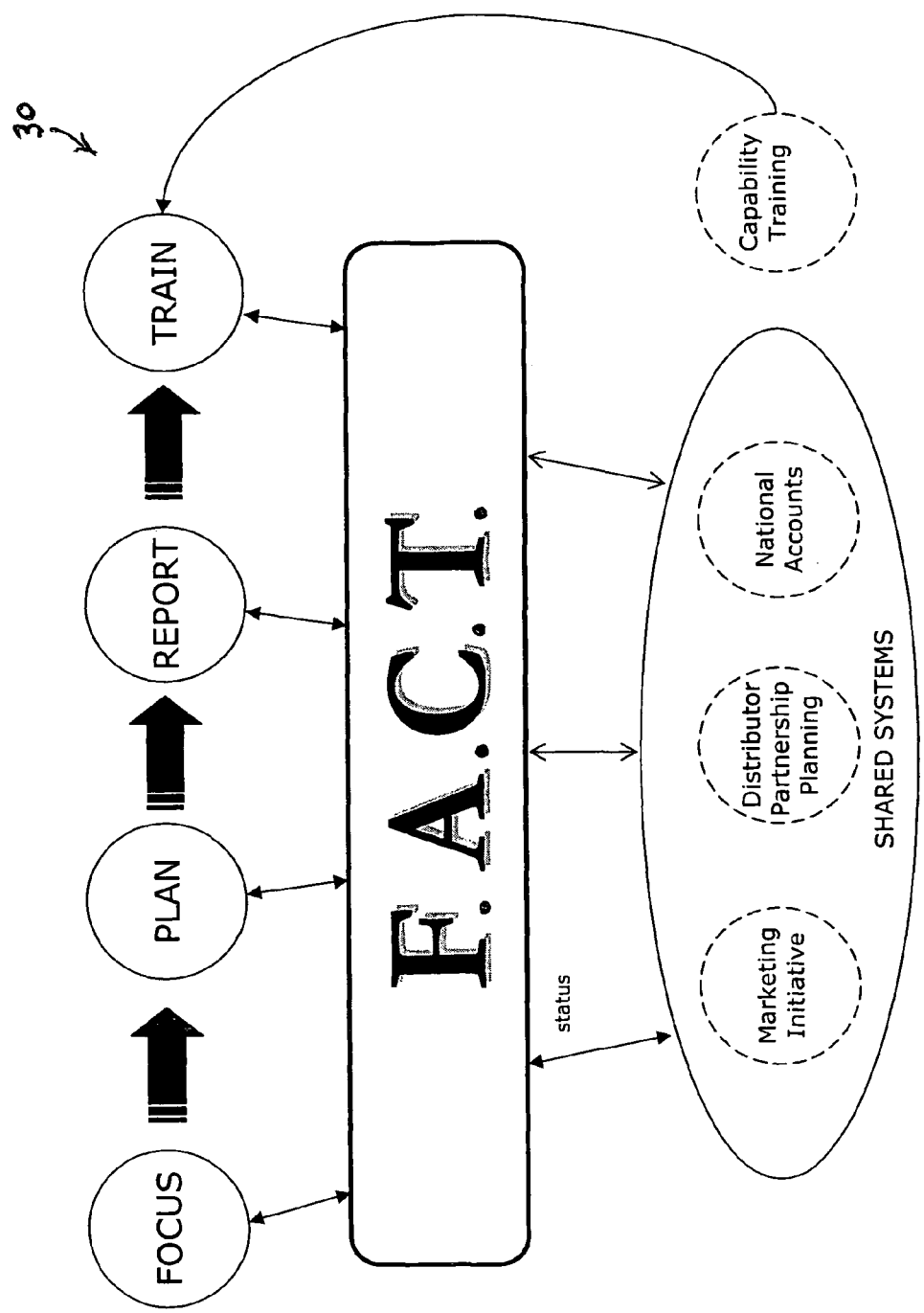
FIG. 1 representatively shows a block flow diagram which illustrates a framework for the sales force automation method.
Figure 1A:
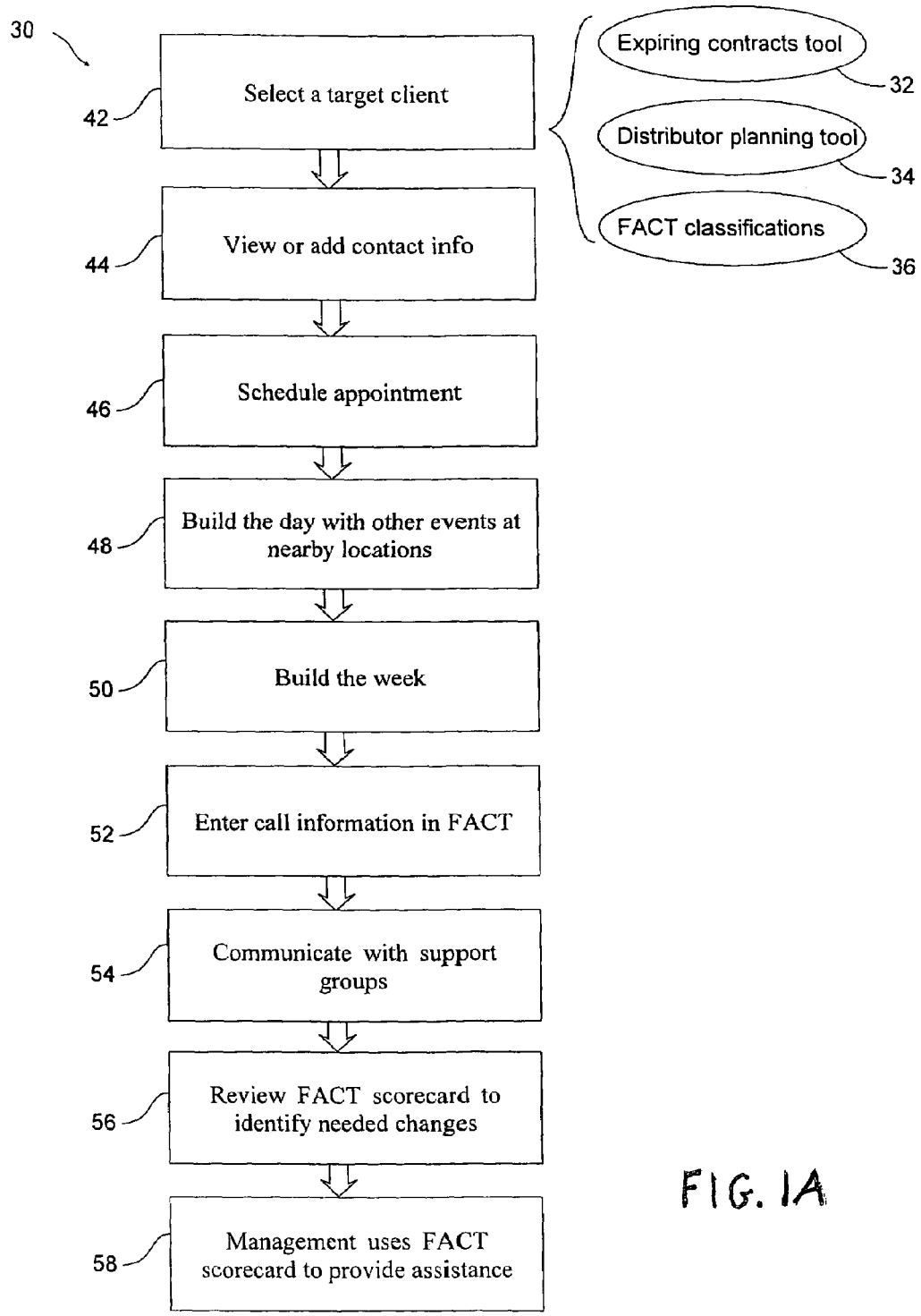
FIG. 1A representatively shows another block flow diagram relating to the sales force automation method.

With reference to FIGS. 1 and 1A, the system and method 30 can help sales force personnel focus their efforts on the highest priorities and monitor their own performance metrics. Sales calls and other events can be planned and targeted toward high-priority customers or clients and toward meeting key objectives. For example, the system and method can provide a planning guide that interacts with planning or scheduling tools to help schedule appointments, linking them with customer (or other client) data and other information that are associated with the customer and with the objectives for the customer. Results of sales activities can be reported quickly and efficiently, and the results can be efficiently distributed and compared to planned objectives. Areas of desired improvement can be more readily identified, and appropriate attention and resources can be more efficiently directed to those areas. Accordingly, the system and method can allow management to better track, guide, and reward the efforts of the sales force. Shared systems and individual activities can all be brought together in the system and method. The system and method can also allow management to provide improved monitoring of performance, and more efficient training. In a particular aspect, a graphical indicator or performance scorecard feature can be used to quickly assess behaviors and identify areas that need improvement. Activities and results can be more effectively mapped to established targets, and the graphical input can quickly show whether the performance exceeds, meets, or is below expectations.

The automated management system and method 30 can provide a distinctive enterprise system which can better track the performance of sales force personnel, and can improve the management and training of the personnel. In a particular aspect, a Focused Account Calling Tool (FACT) can be employed to allow many aspects of sales performance to be tracked in ways that help drive positive behaviors and help sales staff focus their efforts in the most productive areas. The automation method 30 can also allow management to better track, guide, and reward the efforts of the sales force. The system may also include a planning guide feature that can operatively interact with conventional planning or scheduling systems, such as MICROSOFT OUTLOOK, to help in scheduling appointments, and in linking the appointments with customer data and other information that pertain to the status of the customer and the objectives for the customer. The automation system can help sales force personnel concentrate their efforts on the highest priorities and monitor their own performance metrics. For example, the automation method 30 can be configured to monitor the number of calls made, show sales personnel how to prepare for each call (e.g., identify product samples that may be needed, and facilitate the ordering of suitable samples), track the results of the calls against their objectives, and provide resources that help management train and evaluate the sales personnel.

Planned sales calls and other events can be targeted to high-priority customers and toward meeting key objectives. Providing this information in a flexible, hyperlinked interface can dramatically improve behavior in many cases. When employed with wireless laptops or other wireless devices capable of communicating to a central database, the system can assist sales staff and other personnel throughout the day. Shared systems, such as national accounts, distributor plans, and marketing initiatives, and shared databases can all be brought together in the automated method 30 and effectively coordinated with individual activities.

In one aspect of the automated system and method 30, sales force personnel can readily screen for high priority accounts in given geographical areas, identify accounts and contact information, determine where the accounts obtain their materials (e.g., there may be more than one distributor), and help identify the product codes that should be targeted for the customer. When decisions are made at various levels about accounts, e-mails or other communications can be automatically sent to the appropriate sales force staff to help ensure that they are aware of the information. Activities with the client-accounts can then be entered in the system, which can automatically update a performance scorecard system, and archive information relative to the client-account and the sales person, for review by management or the sales person.

A graphical performance scorecard system is an aspect of the system and method that can be used to quickly assess behavior and identify areas in need of improvements. Activities and results can be mapped relative to established targets, and graphical input can quickly show whether the performance exceeds, meets, or is below expectations.

In one aspect of the present invention, the system can include a graphical scorecard system that incorporates a selected variety of performance metrics to establish standards or targets, so that areas needing improvement can be readily identified, and overall performance can be quickly accessed. The scorecard can display metrics of performance on a grid, and each metric can be operatively associated with a graphical indicator of performance. For example, the graphical indicator may include a background color of "red", "yellow", or "green" (or other colors, icons, symbols, background images, font styles, or the like, as well as combinations thereof). The graphical indicator can be selected in accordance with how the performance metric compares to the established standard of performance. Thus, with the graphical scorecard system, management can quickly see areas for increased training by scanning for "red" zones, and individuals can also see where they need to improve, and can readily determine what behaviors are needed to drive the metrics into the desired "green" zone.

FIG. 1A shows a diagram of a representative technique that a sales person might use with the FACT system which has been included in the present system and method. Using a graphical user interface, such as a Web-based interface associated with a PDA (Personal Digital Assistant), laptop, cell phone, or other electronic device in communication with a central sales force management server (not shown), the sales person can first select a target client (e.g., an end user or distributor). Several tools may be employed with the FACT (Focused Account Calling Tool) system to assist in selecting the target client. For example, an expiring contracts tool 32 can provide an automatically generated list of expiring contracts 32 in the sales person's territory. Results from a distributor planning tool 34 can show managerial targets for sales and focus clients. Other classification tools may designate each potential client as high, medium or low priority, and may assign other classifications based on potential sales volume, profitability, customer relationship, or the like. The classifications can be useful in assessing the priority of work with an individual client. Once a target client is selected, the graphical user interface of a client-information system 44 may be configured to display contact information for the client, if the client is already in the database. Alternatively, the client-information system 44 may be configured to allow the sales person to enter or update contact information that can then be stored in a central database. The sales person then uses the contact information to schedule an appointment with a scheduling system 46. This step or the previous steps can also include obtaining additional information to support the appointment (not shown), such as displaying via the graphical user interface recent sales data with the client, contract status, notes from previous visits by the sales person or other sales staff, news about the client, complaints or other matters of potential relevance to future sales, etc. There may also be automated tools provided to order samples, prepare for scheduling a trial, proposing modifications in price or contracts, etc.

The appointments can be scheduled using a graphical user interface that can resemble MICROSOFT OUTLOOK or include OUTLOOK or other known calendaring programs or scheduling tool. In one arrangement, an Internet, Web-based scheduling program or scheduling tool can be configured to generate an input signal to the sales person's separate MICROSOFT OUTLOOK program, to automatically update the person's schedule in OUTLOOK. The Web-based scheduling program can show appointments already in OUTLOOK, or may simply block out time already blocked in OUTLOOK rather than identifying details of non-sales events, or may be used independently of OUTLOOK data (e.g., only displaying sales-related events that have been entered into the FACT system). The scheduling program may be a Web application that resides on a central Web application server, or may use software installed on the user's computer or other electronic device.

Once the desired appointment has been scheduled on a given day, other events for that day may be built with a day-schedule tool or system 48 around the scheduled appointment, as appropriate. Typically, the first appointment made for a given day may be a high-priority appointment that will help the sales person achieve specific sales goals or behavioral goals (e.g., visits with high-priority clients), and subsequent appointments on that day may be with clients of relatively lower priority but that are located near the high-priority initial appointment in order to increase efficiency and reduce travel time. Experience indicates that about three additional appointments per day in a local region can be desirable, though the number may vary, as needed. To assist in optimizing travel, the FACT system may include a capability for identifying target clients near a specified location (e.g., the location of a high-priority client). In a particular feature of the automated method 30, the client information in the sales force management database can include latitude and longitude information, and such information can be used in conjunction with an external service, such as Mapquest.com, to automatically generate driving directions to get from one client to another.

The process of selecting a high-priority appointment and building a day around that appointment may be repeated for other days until a work week has been built with a week-schedule tool or system 50. Experience has demonstrated that good results can be obtained when appointments are created one week or more in advance, and also that the entry and review of results on a weekly basis can be helpful.

At least on a weekly basis and desirably on a daily basis, when possible, results and other information regarding the sales calls can be entered into the FACT system with an operative reporting system 52 to ensure that the information and results of the sales calls are archived and made available for review. The entered information can include details of the sales calls (e.g., recording the outcome), identifying sales trials that are being planned, identifying support needs, etc. The support needs, such as number of samples needed, amendments to contracts or price agreements, etc., can then be communicated to support groups with a support communication system 54 (e.g., communication via email or other operative communication technique).

Once the sales-call data have been entered, the FACT system can summarize results and behavior and compare them to goals using a review system 56. In a particular feature, the review system 56 can include a graphical scorecard system that can readily enable a convenient visualization of performance levels and needed improvements. Each sales person may use the graphical scorecard system for introspective guidance and coaching, relative to behaviors that need to be strengthened or modified. For example, the call information for a week can indicate how many clients a sales person visited or what percentage of a sales person's time was spent meeting with priority clients. These parameters can be displayed in a graphical user scorecard indicating how the actual performance compares with established criteria for success, thereby signaling what behavioral changes may be needed.

The graphical scorecard in various forms can also be made available for review by management with any operative training-assist system 58 to help identify the strengths and weaknesses associated with the behaviors and results-obtained by sales force personnel, thereby allowing management to more accurately identify opportunities for more effective coaching and training.

The automation method 30 can be implemented using input and display devices that are used by sales staff, and are operatively coordinated with a computer network for communication with a central, sales force server. Software that resides fully or partly on the input and display devices or other portions of the computer network can help share data between the server and the input and display devices, and help perform calculations, conduct scheduling, and perform other tasks in the automation system and method 30. In one aspect, the automation system and method 30 can be configured to provide a Web-based system which employs ASP (Active Server Page) and SQL (Structured Query Language) technology and databases, though other approaches and systems may alternatively be employed, if desired.

Figure 2:
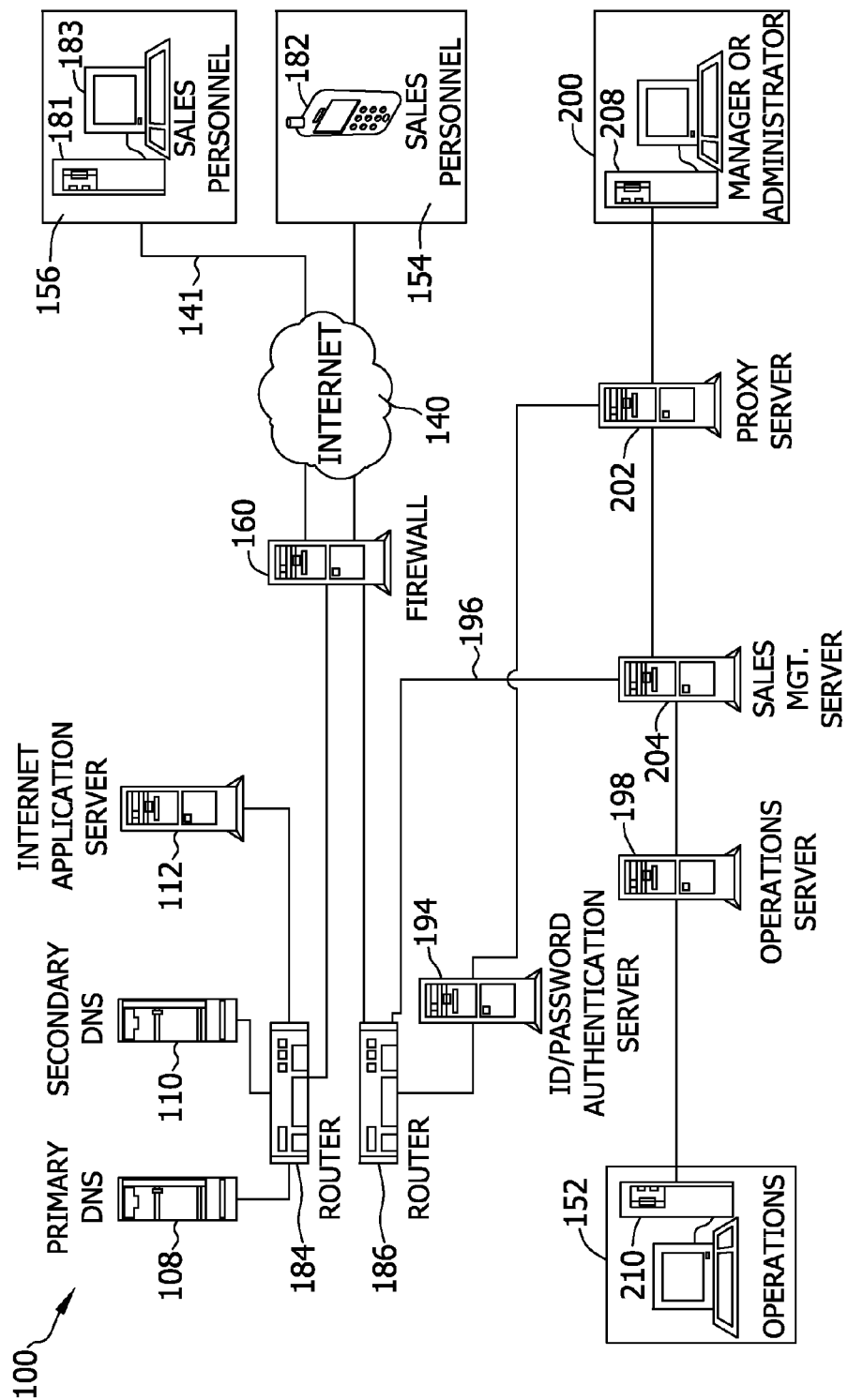
FIG. 2 representatively shows a schematic layout of hardware in a computer system that can be employed with the sales force automation method.

As representatively shown in FIG. 2, a hardware configuration for the automation system or method 30 can include a computerized, management apparatus or system 100, which is adapted for access and operation in cooperation with the Internet 140. As representatively shown, the system hardware can include a firewall 160, a primary DNS (Domain Name System) server 108, a secondary DNS server 110, and an Internet Application Server 112 which can desirably be configured to provide a graphical user interface for Internet users.

Each of the employed components can, for example, be configured in an operative communication with the firewall 160 via a system of routers 184, 186. The employed components of the computer apparatus 100 may be interconnected with wired cable systems 196, with wireless systems or with combinations thereof, as desired.

In the computer apparatus or system 100, internet access may be established by sales force personnel 156 using monitors 183 and computer devices 181 connected with a system of wired cables 141, and/or by other sales force personnel 154 connected with wireless systems or devices, such as wireless handheld devices 182. The wireless devices may, for example, include a PDA (Personal Digital Assistant) device with graphic display and user input capabilities, a mobile phone, a portable computer tablet, or the like, as well as combinations thereof.

When users access the management, computer system 100 through the firewall 160, an ID/password server 194 can verify their identity and permit access to a sales management server that can contain a sales force database and associated data such as client information, account information, scheduling data, sales results and projections, etc. Information may also be shared from an operations server 198. The calculations from software residing thereon or in communication therewith may be used by an operations system 152 in conjunction with other software tools (e.g., production forecasting tools, client management tools, etc.). The operations system may desirably employ an operative arrangement of computer devices 210.

A manager or administrator 200, such as an IT administrator or a sales force manager or director over multiple sales force managers, may access the system using a system of management-computer devices 208, which may operate within the firewall or via the Internet (not shown), as desired. The manager or administrator may view performance results and other data from multiple sales force personnel, or may make systematic changes, broadcast notices, modify software operation, etc., as desired.

The software system can have elements to help sales force personnel focus on key customers in making plans. Thus, contact data in the sales force database can include any desired client-information, such as information regarding: an end-user (purchaser) name, an ID (identification) number, address information including geographical latitude and longitude for automated directions or travel optimization, the associated account manager, the status of the account (e.g., active or inactive), the identified strategy for working with the client, and the like.

Data displayed in any display-screen or provided in any generated file can be hyperlinked to additional information. For example, the present invention can include conventional tools to review past calls and their outcome. A manager or sales person can request a display of all calls or recent calls with a particular client, or for calls dealing with particular products, geographical regions, sales volume criteria, and the like. Relevant calls can then be displayed along with appointment dates and the party involved, the seller, the outcome of the visit, reasons for the outcome, and comments. Hyperlinks associated with the displayed information can then result in a display of more detailed information or related records, as desired.

The system and method 30 can be configured to display data related to clients. In addition to contact information, such as information pertaining to region, business priority, sales targets, and so forth, other information can be displayed, such as information pertaining to metrics for the sales to the client. Hyperlinks with the metrics, for example, may provide access to scorecard displays to show how the metrics compare to established criteria, parameters and/or target-values, and links may also provide a means to generate comparison scorecards for additional clients, for the region as a whole, or for other groupings.

Figure 3:
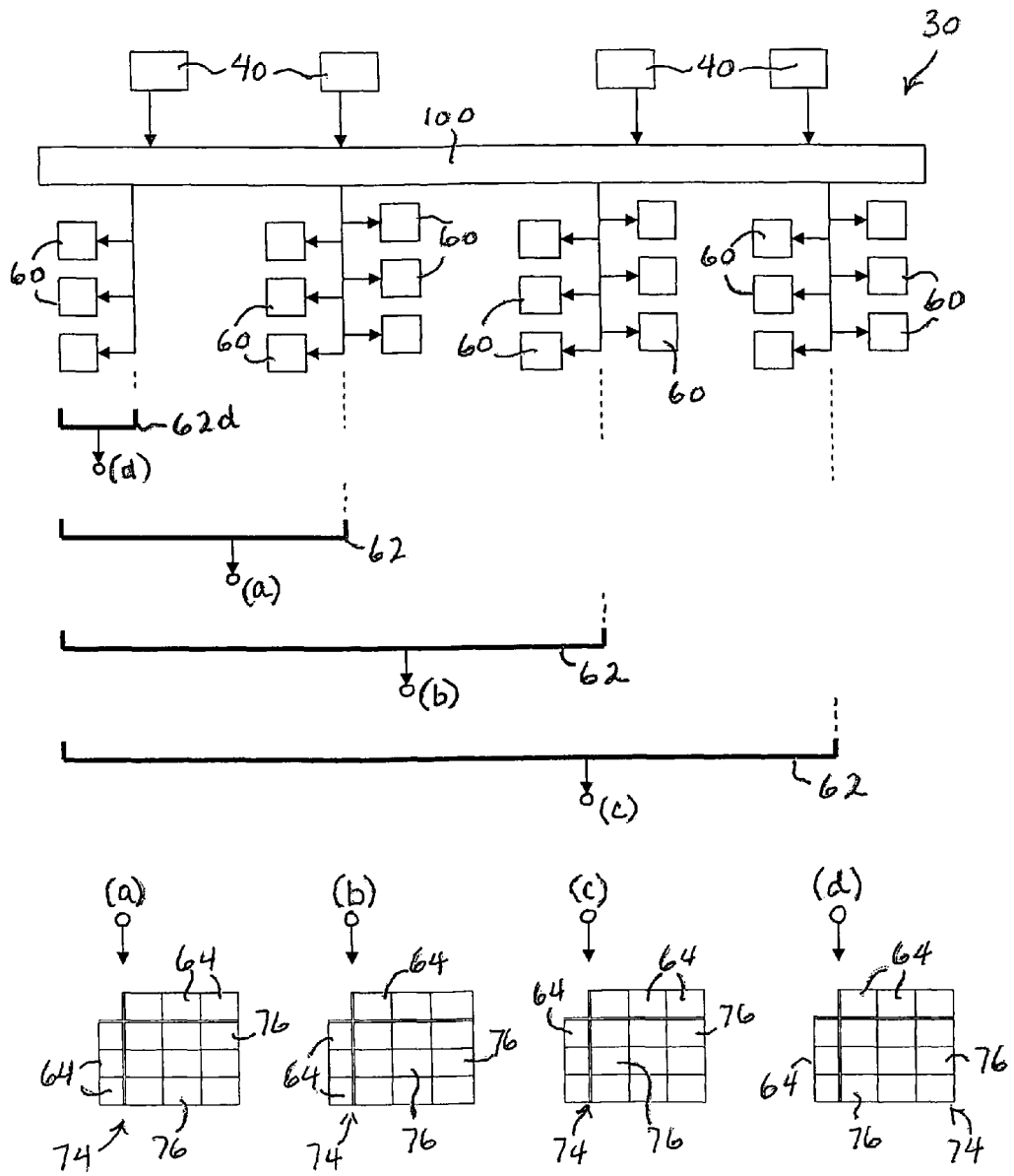
FIG. 3 representatively shows a further block flow diagram relating to the handling of information and data by the sales force automation method.

With reference to FIGS. 3 and 4, the sales force automation method 30 can be configured to operatively direct a computer system 100 to employ one or more predetermined input-parameters 60, wherein each input-parameter can be applicable or pertinent to one or more clients. Collections or other sets of input-values 40 can be operatively sorted to the input-parameters for a corresponding, individual client. The input-values that pertain to a selected client-set 62 can be operatively gathered, and the computer system can sort the input-values from the client-set according to sales-parameters 64 that pertain to the selected client-set. The sorted input-values can be compiled and analyzed to generate a sales-performance-value 84 for each sales-parameter. Upon a comparison between the sales-performance-value for a sales-parameter and a corresponding parameter-target-value or target-range, the computer system 100 can determine an appropriate sales performance-rating. Upon such determination of the sales performance-rating, the computer system can be operatively directed to display a graphical indicator 68 that corresponds to the sales performance-rating.

In more particular aspects, the sales force automation method 30 can include a providing of instructions which can operatively direct a computer system 100 to employ one or more predetermined input-parameters 60. Desirably, the computer system can be directed to employ a plurality of input-parameters. Additionally, each input parameter 60 may be operatively associated and coordinated with a more comprehensive, or more encompassing sales-force plan.

The system and method 30 can be configured to provide operative instructions, which operatively direct the computer system to operatively accept the one or more individual sets of input information 40. Each individual item or set of input information can pertain to a corresponding individual client. Additionally, each individual item or set of input information can be operatively sorted to a corresponding set of the input-parameters for the corresponding, individual client by employing instructions provided by the system and method 30. It should be readily appreciated that the individual client may, for example, be an end-user, a distributor, a national account or the like.

The system and method can also be configured to provide instructions, which operatively direct the computer system to accept an operative input-value for each item of input-information 40. In addition, the system and method can be configured to provide instructions which operatively direct the computer system to sort the input-values according to the input-parameters.

In the various arrangements of the system and method 30, the input-value may be in any operative form, and the sorting can be conducted or accomplished in any operative manner. For example, the input-value may include an operative check-box or target-circle in an active web page, an "on" or "yes" entry, a null or "no" entry, a selection from an operative menu listing, an entry of a number amount into an operative field, an entry of text into an operative field, or the like, as well as combinations thereof. In particular arrangements, the entry and/or sorting of the input-values can include filling in the blanks on "activities" call-sheets, gathering data regarding "business results" from shared systems or shared databases, and the like. The shared systems or shared databases may be generated and/or maintained in configurations that are operatively separate from the system and method 30. Accordingly, an appropriate input-value can be selectively generated and entered with respect to each desired input-parameter for each client. Additionally, the input-values can be operatively configured for storage and retrieval in a conventional, computerized database.

The system and method 30 can be further configured to provide instructions which operatively direct the computer system to gather the input-values that pertain to a selected client-set 62. Any operative client-set may be employed. For example, the client-set may be an individual client 62d, or a plurality of two or more clients that are serviced or otherwise handled by a particular sales-person. In another aspect, the client-set may be one or more individual clients that are serviced or otherwise handled by a particular group of sales-persons (e.g. FIG. 3; flow path (a)), and the group of sales-persons may or may not be associated with a particular geographical district. Accordingly, the client-set would correspond to a sales-group, and the sales-group may be coordinated or otherwise handled by a group-manager or district-manager (e.g. FIG. 3; path (b)). In a further aspect, the client-set may be one or more individual clients that are serviced or otherwise handled by a particular collection of sales-groups, and the group of sales-groups may or may not be associated with a particular geographical district. Accordingly, the client-set would correspond to a sales-force (e.g. FIG. 3; path (c)), and the sales-force (e.g. FIG. 3; path (c)), and the sales-force may be coordinated or otherwise handled by a sales-force-manager. Other collections of relatively larger or smaller sets of clients may optionally be arranged and employed.

The system and method 30 can also be configured to provide instructions to operatively direct the computer system to sort the input-values from the client-set according to sales-parameters 74 that pertain to the selected client-set 62. Additionally, each sales-parameter may be operatively associated with a scorecard aspect of the system and method 30. A particular client-set may have sales-parameters that are the same as, similar to, or different than the sales-parameters of another client-set. For example, the sales-parameters that pertain to the client-set of a sales-person can be the same as, similar to, or different than the sales-parameters that pertain to the client-set of a sales-group or sales-district. Additionally, the sales-parameters that pertain to the client-set of a sales-force can be the same as, similar to, or different than the sales-parameters that pertain to the client-set of a sales-group.

To allow a more effective comparison, different sales-persons within the overall sales organization can desirably have corresponding sets of sales-parameters that are the same or similar. In a like manner, the set of sales-parameters that pertain to one sales-group within the overall sales organization can be same as or similar to the set of sales-parameters that pertain to another sales-group within the sales organization.

In the various arrangements of the system and method 30, any operative sales-parameter or combination of sales-parameters may be employed. The sales-parameters may, for example, include selected metrics. Additionally, the sales-parameters may pertain to selected sales-activities, and the sales-activities may pertain to one or more individual sales-persons. The sales-parameters may also include metrics that pertain to selected sets of clients, or to selected business-results. Such business-result parameters can, for example, pertain or be related to product volume, revenue, net-revenue, sales contribution, profit and the like.

In particular aspects, the system and method 30 can be configured to provide instructions which operatively direct the computer system to compile and analyze the sorted input-values to generate a sales-performance-value for each sales-parameter. Thus, a sales-performance-value can be derived from the input-information that is compiled according to the sales-information gathered or otherwise accumulated in accordance with a selected client-set. For example, information or data regarding the sales-parameter of the sales-person can be gathered from all of the clients associated with that sales-person. The gathered data can then be compiled and analyzed to produce a sales-performance-value for the particular sales-parameter of the sales-person. The gathered data may be analyzed in any operative manner. For example, the data may be analyzed in accordance with a mathematical formula or mathematical procedure, or with a combination of mathematical formulas or procedures to generate the performance value.

In a like manner, a particular sales-parameter may pertain to a sales-group. Information or data regarding the sales-parameter of the sales-group can be gathered from all of the clients associated with that sales-group. The gathered data can then be compiled and analyzed to produce a sales-performance-value for the particular sales-parameter of the sales-group. Similarly, a performance-value can be generated, derived or otherwise produced for a sales-parameter of a selected sales-force or of other operative collection of sales-persons.

It should be readily appreciated that the sales-performance-values pertaining to the sales-parameters of a particular sales-person or collection of sales-persons (e.g. sales-group or sales-force) can be operatively processed in accordance with any selected time period. The time period may be a day, group of days, week, group of weeks, month, group of months, year, group of years, or the like. Accordingly, sales-person-performance-values, sales-group performance-values, and/or sales-force performance-values can be operatively generated, calculated or otherwise compiled with respect to any desired set of hours, days, weeks, months and/or years.

In another aspect, the system and method 30 can be configured to provide instructions which operatively direct the computer system to display the sales-performance-value for each sales-parameter. For example, the performance value may be the actual performance value obtained by a sales-person, sales-group or sales-force. The system and method can be further configured to provide instructions which operatively direct the computer system to provide a parameter-target-value for each sales-parameter. The target-value may be a particular, individual value or a predetermined range of values. Additionally, the target-value (or range of values) may or may not be displayed.

The system and method can further be configured to provide instructions which operatively direct the computer system to provide a series of performance-ratings for each sales-parameter. The performance-ratings can be arranged in a graduated series. For example, the performance-ratings can include rankings, such as "below target", "meets target", "exceeds target", and the like. Additionally, the system and method can be configured to provide instructions which operatively direct the computer system to provide a corresponding graphical indicator 66 for each sales-performance-rating. Any operative graphical indicator may be employed in any of the various arrangements of the system and method 30. For example, the graphical indicator may include a symbol, pattern, name, shading, color or the like, as well as combinations thereof. The computer system can be configured to provide a graduated series of performance-ratings for each sales-parameter. In a desired arrangement, the graphical indicator can include a color-coded indicator. Accordingly, the graphical indicator can be a series of colors, such as a series that includes the color "red", the color "yellow", and/or the color "green".

It should be readily appreciated that for the various arrangements of the system and method, the values of the various targets can be operatively determined in accordance with a corresponding business plan and derived in a manner that is conventional and well known. Additionally, the selected target-values may or may not be static, and may or may not change from time to time. For the present disclosure, the term "below target", or the like, desirably refer to an actual performance-value which is below a predetermined target-value. The term "meets target", or the like, desirably refers to an actual performance-value which at least meets the predetermined target-value. The term "exceeds target", or the like, desirably refers to an actual performance-value which at least meets the predetermined target-value and is beyond the target-value by at least a selected, significantly larger premium amount. It should be readily appreciated that for the various arrangements of the system and method, the value of the various premium amounts can be operatively determined in accordance with the corresponding business plan and derived in a manner that is conventional and well known. Additionally, the values of the selected premium amounts may be dynamic or static, and may or may not change from time to time.

In other features, the system and method 30 can be configured to provide instructions which operatively direct the computer system to compare the sales-performance-value for each sales-parameter to its corresponding parameter-target-value. Upon such comparison between the sales-performance-value for each sales-parameter and its corresponding parameter-target-value, the system and method can be configured to provide instructions which operatively direct the computer system to determine the appropriate sales performance-rating. Upon such determination of the sales performance-rating, the system and method can be configured to provide instructions which operatively direct the computer system to display the graphical indicator 66 that corresponds to the sales performance-rating. The display of graphical indicator can be simultaneous or non-simultaneous with the display of performance-value. The display of the graphical indicator can be in the same or different display-cell as the display of performance-value.

In the various descriptions in the present disclosure that pertain to the providing of instructions, the instructions can be provided in any operative manner. For example, the instructions can be provided by commands or inputs from a keyboard or other operative input device. In a desired arrangement, the instructions can be provided in a machine-readable form. The machine-readable-form may include magnetic media, optical media, a magnetic-memory device, an optical-memory device, a flash-memory device, a magnetic disk, an optical disk or the like, as well as combinations thereof.

As representatively shown in FIGS. 3 and 4, the sales force automation method 30 can further include a providing of a matrix-grid 74 display of cells wherein the matrix-grid has a first axis 22, and at least a second axis 24. A first array of a set of first, sales-parameters 64 (A, B, C, D, etc.), which pertain to the selected client-set 62, can be arranged along the first axis. For example, the first set of sales-parameters can include sales-parameters 64 (A, B, C, D, etc.), and the first axis can be generally aligned along a horizontal row direction of the selected matrix-grid 74. Additionally, a second array of a set of second, sales-parameters which pertain to the selected client-set, can be arranged along the second axis. For example, the second set of sales-parameters can include sales-parameters 64 (1, 2, 3, 4, etc.), the second axis can be generally aligned along a vertical column-direction of the selected matrix-grid 74. One or more, individual matrix-cells 76 can be operatively distributed at corresponding individual, intersect-locations within the matrix-grid. As representatively shown, for example, each matrix-cell can be located at a position where a row of the matrix-grid intersects a column of the matrix-grid. In a desired aspect, each matrix-cell 76 can be suitably configured to represent an operative combination of a corresponding first sales-parameter and a corresponding second sales-parameter.

A matrix-grid 74 can be generated in accordance with any desired client-set 62. In a particular arrangement, the matrix-grid can be generated with the sales-parameters and information input-values that pertain to an individual client. For example, see path (d) representatively shown in FIG. 3. In another arrangement, the matrix-grid can be generated with the parameters and input-values that pertain to the collection of clients associated with an individual sales-person (e.g. path (a) of FIG. 3). In a further arrangement, the matrix-grid can be generated with the sales-parameters and values that pertain to the collection of clients associated with an individual sales-group or sales district (e.g. path (b) of FIG. 3). In still another arrangement, the matrix-grid can be generated with the sales-parameters and input-values that pertain to the collection of clients associated with an individual sales-force (e.g. path (c) of FIG. 3).

Instructions can be provided to suitably direct the computer system to operatively determine a cell-performance-value 84 for each of one or more selected matrix-cells 76. To provide the appropriate performance value, information and data can be gathered, compiled and analyzed to produce the corresponding cell performance-value for the particular matrix cell. The data may, for example, be gathered in accordance with a selected client-set. Additionally, the data may be analyzed in any operative manner. For example, the data may be analyzed in accordance with a mathematical formula or mathematical procedure, or with a combination of mathematical formulas and/or procedures to generate the corresponding performance value. It should be appreciated that the cell-performance-value may or may not be displayed, but may be held and/or stored in a conventional manner.

To help evaluate the employed information and data, the system and method 30 can include a providing of instructions which operatively direct the computer system to operatively provide each of the selected matrix-cells with a cell target-value. As mentioned previously, the target-value may be a particular, individual value or a predetermined range of values. Additionally, the selected target-value (or range of values) may or may not be displayed, but may be held and stored in a conventional manner.

Each of the selected matrix-cells can also be provided with a corresponding series of cell-performance-ratings, and the performance-ratings may be arranged in a graduated series. For example, the performance-ratings can include rankings, such as "below target", "meets target", "exceeds target", and the like. The system and method 30 can also include a providing of instructions to operatively direct the computer system 100 to compare the cell-performance-value to its corresponding cell target-value. Upon such comparison between the cell-performance-value for the set of activity-parameters and its corresponding cell target-value, instructions can be provided to operatively direct the computer system to determine the appropriate cell-performance-rating.

The system and method can further include instructions which operatively direct the computer system 100 to provide a corresponding graphical indicator 68 for each of the determined, cell-performance-ratings. Additionally, the system and method can provide instructions to operatively direct the computer system to appropriately display the graphical indicator that corresponds to the determined cell-performance-rating of the selected matrix-cell 76.

FIG. 5 shows a representative display of an example of the matrix-grid and scorecard aspects of the present system and method. In the illustrated example, eight representative metrics or sales-parameters pertaining to a sales-person are shown and distributed along the horizontal row direction of the grid. Three other, representative parameters are distributed along a second, vertical column direction. The three, representatively shown parameters are selected time periods: e.g. year to date (YTD), the past 13 weeks (quarter), and the past week. Accordingly, a first set of sales-parameters are distributed along a horizontal, row direction of the matrix-grid 74, and a second set of sales-parameters pertaining to the selected time periods are distributed along a vertical column direction of the matrix-grid.

The scorecard feature can be especially useful in the complex area of managing sales force personnel in situations, where third-parties may actually write the sales and input the information into related, and possibly separately provided, databases. For example, the sales force staff may visit end users and promote products, but the actual orders may be placed through a distributor. In such cases, it has historically been difficult to relate sales results to the behaviors of the sales force. For example, it has been difficult to determine whether or not the orders placed were associated with sales calls to end users. To address such previous and largely unmet needs with respect to a relating of sales force effectiveness to sales force behaviors, various metrics can be employed.

As shown in FIG. 5, for example, a desired configuration can include the representatively shown selection of eight metrics, each of which can be updated at least on a periodic (e.g. weekly) basis. The representatively employed metrics or parameters are: (1) Total Calls (total number of visits to end users as well as to distributors); (2) Total End User Calls; (3) Trial Rate (e.g. % of end user calls that result in trial of product); (4) Conversion Rate (e.g. % of end users called upon that order new product); (5) Plan Execution for End Users (the total number of end user calls carried out that were planned at the beginning of the week); (6) Plan Execution for Distributors (the total number of distributor calls carried out that were planned at the beginning of the week); (7) Target Account Focus for End Users (e.g. the percentage of end users called that are ranked as high priority accounts); and (8) Target Account Focus for Distributors (e.g. the percentage of distributors called that are ranked as high priority distributors).

As representatively shown, areas of outstanding performance can be identified by an operative association of the cell with a graphical indicator, such as by a shading or other operative highlighting of the cell. For example, the cell may be highlighted with a "green" color. Similarly, areas of acceptable performance can associated with a "yellow" color, and areas of inadequate performance (relative to established criteria or target-values) can be associated with a "red" color. The highlighting of the cells can rapidly allow the sales person, as well as management or others, to see how performance is trending over various time periods (any selected time periods could be considered, of course), and trending with respect to targeted metrics. The upper portion of the scorecard displays the results according to specific metrics and time periods, The targeted (high priority) end users and distributors can be reviewed and updated monthly based on sales. For each of the representatively shown eight metrics, there are criteria defining ranges for effective and outstanding performance. Outstanding performance results in a "green" background for tabulated results, effective but not outstanding is "yellow", and less than effective is "red". Of course, other metrics could be used, or any subset of the eight previously named metrics could be used, alone or in combination with other metrics of known relevance to sales force analysis. And other colors or graphical indicators could be used to show evaluations of performance relative to predefined criteria. The data relating to the selected metrics and/or the scorecard displays derived from activities and results can be downloaded to a sales force server by sales force staff or others via a graphical user interface in electronic communication with the server.

The results for each week or results averaged over other time periods can be displayed and viewed by managers to identify training needs or by sales force personnel to see how they are doing and where changes in behavior are needed. The incorporation of the metrics and/or sales-parameters, and the incorporation of the graphical display of results can help drive the behaviors that lead to high sales; such as the executing of many planned calls to targeted distributors and end users to obtain trials and sales of product.

The selected metrics and/or sales-parameters can then be rolled into other performance attributes, such as one or more overall effectiveness parameters based on selectively weighted accumulations of identified metrics or parameters, with the weighting being tailored to drive the behaviors needed to generate improvement. For example, input-information and input-values, such as information and values pertaining to "calls" and "account effectiveness" can be rolled up into an "activities effectiveness" parameter that can, for example, be categorized as "outstanding", "effective", or "needs improvement". Sales results can also be categorized in the same way. In a representative embodiment, for example, a 3×3 grid (or other grid, such as, 4×4, 2×2 or 3×2) of results versus activities effectiveness can then be created with a colored field or graphical symbol present in one of the nine boxes to identify where the employee is on the grid, and this readily interpretable result can then be used to compare employee performance against other employees or divisions. Multiple people may be displayed on one grid, with graphical indicators (e.g., dots or other symbols) or numbers in the grid showing the cumulative results of a group of people. In this manner, for example, a district manager can readily see how his sales force staff is performing and how many people are lagging in terms of desired behaviors and sales results.

In particular aspects, the sales force automation method 30 can further include providing a selected set of sales-parameters, and providing each sales-activity-parameter with a corresponding weighting factor. In the various configurations of the system and method 30, the weighting factor can be employed in a well-known, conventional manner to help differentiate a relative importance between individual sales-parameters. Any operative evaluation, computation or processing may be employed to provide the weighting factor. In a desired aspect, the selected set of sales-parameters can pertain or be related to a selected client-set (e.g. the client-set of a sales-person, sales-group or sales-force). In other aspects, the sales-parameters may include selected activity-parameters, and the weighting factor may, for example, include a predetermined numerical-multiplier. The numerical-multiplier can be any operative whole number or fractional number.

For each sales-activity parameter, the sales-performance-value for the sales-activity-parameter can be obtained; and such value can be processed by its corresponding weighting factor; to thereby obtain a weighted-activity-value. All of the weighted-activity-values for the sales-activity parameters can then be operatively combined together, and the combination may be in accordance with a selected mathematical formula or operation. Additionally, the combination can be configured to provide a composite, activities-value. For example, the weighted-activity-values may be added or summed together. In a particular arrangement of the system and method, a selected average of the weighted-activity-values for the sales-activity parameters can be taken to obtain the composite activities-performance-value. For example, an arithmetic-average may be taken.

Instructions provided by the system and method 30 can direct the computer system 100 to provide the set of sales-activity parameters with an activities target-value. Additionally, the set of sales-activity parameters can be provided with a corresponding series of activities-performance-ratings. For example, the performance-ratings can include rankings, such as "below target", "meets target", "exceeds target", and the like.

The system and method 30 can also provide instructions to operatively direct the computer system to compare the activities-performance-value for the set of activity-parameters to its corresponding target-activities value. Upon such comparison between the activities-performance-value for the set of activity-parameters and its corresponding activities target-value, the system and method can provide instructions which operatively direct the computer system to determine the appropriate activities-performance-rating.

In addition, the system and method can be configured to provide a selected set of sales-parameters which includes selected business-result-parameters. The system and method can also be configured to provide each business-result-parameter with a corresponding weighting-factor. In a desired aspect, the selected set of business-result parameters can pertain or be related to a selected client-set (e.g. the client-set of a sales-person, sales-group or sales-force). In other aspects, the weighting factor may, for example, include a predetermined numerical-multiplier, and the numerical-multiplier can be any operative whole number or fractional number.

For each business-result-parameter, its corresponding business result-performance-value can be obtained, and such performance-value can be processed by its corresponding weighting-factor; to thereby obtain a weighted-result-value. All of the weighted-activity-values for the business-result parameters can then be operatively combined together, and the combination may be in accordance with a selected mathematic formula or operation. Additionally, the combination can be configured to provide a composite, business-results-value. For example, the weighted-activity-values may be added or summed together. In a particular arrangement of the system and method, a selected average of the weighted-activity-values for the business-result parameters can be taken to obtain the composite, business-results-performance-value. For example, an arithmetic-average may be taken.

The set of business-result parameters can be provided with a results-target-value. Additionally, the set of business-result-parameters can be provided with a corresponding series of business-results performance-ratings. For example, the performance-ratings can include rankings, such as "below target", "meets target", "exceeds target", and the like.

The system and method 30 can also provide instructions to operatively direct the computer system to compare the results-performance-value for the set of business-result parameters to its corresponding results target-value. Upon such comparison between the results-performance-value for the set of business-result parameters and its corresponding results target-value, the system and method can provide instructions which operatively direct the computer system to determine the appropriate results-performance-rating.

The system and method 30 can further include instructions to provide an matrix-grid display of cells wherein the array of activities-performance-ratings are arranged along a first axis, and the array of results-performance-ratings are arranged along a second axis. For example, the first axis can be arranged along a generally horizontal direction, and the second axis can be arranged along a generally vertical direction. Each cell 76 of the matrix-grid 74 display can be configured to operatively represent a matrix-combination of the determined activities-performance-rating and the determined results-performance-rating, where such ratings correspond to the matrix-cell. Thus, each matrix-cell 76 can be positioned at a location which represents an intersection of a row and a column of the selected matrix-grid. Additionally, each matrix-cell 76 can be configured to represent a composite rating.

The system and method 30 can also provide instructions which operatively direct the computer system to operatively designate the cell of the matrix-grid that corresponds to the combination of the determined, activities-performance-rating and the determined, results-performance-rating of the selected client-set. Any operative technique may be employed to designate the appropriate matrix-cell 76. For example, the designation may include a check-mark, number, letter, symbol, color, shading, pattern or the like, as well as combinations thereof. For example, the appropriate matrix-cell can be designated with an X-mark (e.g. FIG. 5A).

The computer system can be provided instructions which operatively direct the computer system to incorporate or otherwise provide a series of composite, matrix-ratings. Desirably, the matrix-ratings can be arranged in a graduated series. For example, the performance-ratings can include rankings, such as "below target", "needs improvement", "meets target", "progressing", "exceeds target", "outstanding", and the like. The system and method can further provide instructions which operatively direct the computer system to calculate, evaluate or otherwise provide a corresponding, composite matrix-rating for one or more selected cells of the matrix-grid display, and can provide instructions which operatively direct the computer system to provide a corresponding graphical indicator for each composite matrix-rating. Then the computer system can be provided with instructions which operatively direct the computer system to display the graphical indicator that corresponds to the composite matrix-rating of the designated-cell of the matrix-grid that, in turn, corresponds to the combination of the determined activities-rating and the determined results-rating of the selected client-set.

With reference to FIG. 5A, a display provided by the system and method 30 can be configured to show a scorecard for aggregate performance. As representatively shown, a particular aspect of the scorecard can include a matrix 74 that includes a composite evaluation that pertain to sales-activities and business-results. As representatively shown, the "activities" section can have three levels: "outstanding," "effective," and "needs improvement". The representatively shown "results" section also can have three levels: "behind", "progressing", and "achieving". The time period associated with the shown example, is year-to-date (YTD).

The representative example of the composite assessment illustrated in FIG. 5A can be generated by employing the following representative procedure. In a particular configuration, the following activities parameters (metrics) can be selected: (1) Total Calls; (2) Total End User Calls; (3) Trial Rate; (4) Conversion Rate; (5) Plan Execution for End Users; (6) Plan Execution for Distributors; (7) Target Account Focus for End Users; and (8) Target Account Focus for Distributors.

Each activities-parameter can be processed with a weighting factor by employing any operative technique. In a particular arrangement, each activities-parameter can be processed with a weighting factor in accordance with the following procedure: (1) Total Calls is allocated 10 "points"; (2) Total End User Calls is allocated 15 "points"; (3) Trial Rate is allocated 20 "points"; (4) Conversion Rate is allocated 20 "points"; (5) Plan Execution for End Users is allocated 10 "points"; (6) Plan Execution for Distributors is allocated 10 "points"; (7) Target Account Focus for End Users is allocated 15 "points"; and (8) Target Account Focus for Distributors is allocated 5 "points". It should be readily appreciated that the allocation of the various amounts of "points" can be suitably determined in accordance with the corresponding business plan, in a manner that is conventional and well known. Additionally, the selected allocations may or may not be static, and may or may not change from time to time.

The weighted values (activities-parameters) can be processed to obtain a (weighted) composite, activities-value by employing any operative technique. In a particular arrangement, the weighted values (activities-parameters) can be processed in accordance with the following procedure. Where an actual performance value for an individual activities-parameter has attained a high, exceeds-target rating, which may be correlated to a "green" (g) graphical indicator, such parameter may, for example, be given 100% of its allocated number of points. Where an actual performance value for an individual parameter has attained a medium, meets-target rating, which may be correlated to a "yellow" (y) graphical indicator, such parameter may, for example, be given 50% of its allocated number of points. Where an actual performance value for an individual parameter has attained a low, below-target rating, which may be correlated to a "red" (r) graphical indicator, such parameter may, for example, be given 0% of its allocated number of points. The number of given points from all of the selected parameters are then summed to determine a total number of given points pertaining to "Activities". Where the total number of given points is greater than a threshold value of 75, the composite, activities-value is assigned a high, "Outstanding" ranking which can be correlated to a "green" (g) graphical indicator. Where the total number of given points is between 50 and 75, the composite, activities-value is assigned a medium, "Effective" ranking which can be correlated to a "yellow" (y) graphical indicator. Where the total number of given points is less than a threshold value of 50, the composite, activities-value is assigned a low, "Needs Improvement" ranking which can be correlated to "red" (r) graphical indicator. It should be readily appreciated that the threshold values for the composite, "activities" values can be suitably determined in accordance with the corresponding business plan, in a manner that is conventional and well known. Additionally, the selected allocations may or may not be static, and may or may not change from time to time.

With reference to FIG. 6, it should be readily appreciated that the growth target-values for the various results-parameters can be suitably determined in accordance with the corresponding business plan, in a manner that is conventional and well known. For composite assessment in the example illustrated in FIG. 5A, the following, representative Results-parameters (metrics) can be selected: Wiper ANR Actual; Washroom SC Actual; Skin Care ANR Actual; Total ANR Actual; and Total SC Actual.

Each results parameter can be processed with a weighting factor in accordance with the following procedure: Wiper ANR (Adjusted Net Revenue) Actual is allocated 40 "points"; Washroom SC (Sales Contribution variable profit) Actual is allocated 32 "points"; Skin Care ANR Actual is allocated 8 "points"; Total ANR Actual is allocated 10 "points"; and Total SC Actual is allocated 10 "points". It should be readily appreciated that the allocation of the various amounts of "points" can be suitably determined in accordance with the corresponding business plan, in a manner that is conventional and well known. Additionally, the selected allocations may be static or dynamic, and may or may not change from time to time.

The weighted values (results parameters) can be processed with any operative technique to obtain a (weighted) composite, results-value. In a particular arrangement, the weighted values (results parameters) can be processed in accordance with the following procedure. Where an actual performance value for an individual activities-parameter has attained a high, exceeds-target rating, which can be correlated to a "green" (g) graphical indicator, such parameter may, for example, be given 100% of its allocated number of points. Where an actual performance value for an individual parameter has attained a medium, meets-target "yellow" (y) rating, which can be correlated to a "yellow" (y) graphical indicator, such parameter may, for example, be given 50% of its allocated number of points. Where an actual performance value for an individual parameter has attained a low, below-target rating, which can be correlated to a "red" (r) graphical indicator, such parameter may, for example, be given 0% of its allocated number of points. The number of given points from all of the selected parameters are then summed to determine a total number of given points pertaining to "Results". Where the total number of given points is greater than a threshold value of 75, the composite, activities-value is assigned a high, "Achieving" ranking which can be correlated to a "green" (g) graphical indicator. Where the total number of given points is between 50 and 75, the composite, activities-value is assigned a medium, "Progressing" ranking which can be correlated to a "yellow" (y) graphical indicator. Where the total number of given points is less than a threshold value of 50, the composite, activities-value is assigned a low, "Behind" ranking which can be correlated to a "red" (r) graphical indicator. It should be readily appreciated that the threshold values for the composite, "activities" values can be suitably determined in accordance with the corresponding business plan, in a manner that is conventional and well known. Additionally, the selected allocations may or may not be static, and may or may not change from time to time.

Since, in the representatively shown example, the composite Activities ranking was determined to be "Outstanding", and the composite Results ranking was determined to be "Achieving", the computer system designated the matrix-cell, which corresponded to this combination of rankings, with the illustrated "X". Since the designated matrix-cell had a cell-ranking that corresponded to an "exceeds target" ranking, the designated matrix-cell was further identified with the graphical indicator provided by a shading of the background of the matrix-cell with a green-color (g).

In the various arrangements of the system and method 30, input-information about accounts may also be displayed graphically in the computer interface using the scorecard approach to more effectively communicate the status. If the status of an account is improving, it can be displayed with a "green" background. If there has been no activity with the account for 30 days, for example, the account can be displayed with a "yellow" background. If there has been no activity in 90 days, the background can be displayed as "red". Simple graphical displays related to account information can help sales force immediately identify accounts in need of attention.

In terms of relationships with customers or other clients, the tool provides more customized and personalized support, and helps the sales force be more informed and responsive. It provides more support for sales force staff, and more visibility for sales operations.

Results can be displayed in various forms of the scorecard model for individuals, departments, regions, nations, or other groupings, allowing great flexibility in tracking performance and training needs.

Actions taken and results are regularly entered into the system by the sales force personnel and others, resulting in a continuously updated history for each account that can be used to improve performance and better identify high priority accounts.

FIG. 6 shows another aspect of the scorecard feature that can be generated by the system and method 30. As illustrated in the representatively shown configuration, the scorecard can be applied to one or more distributors of one or more corporate products, and can display how the sales levels of selected distributors compare to predefined criteria or target-values that have been established for a selected set of metrics. Such graphical displays can assist in identifying areas of opportunity or emphasis for future work with distributors to improve their operations. The computer system can be configured to automatically generate the scorecards. For example, such scorecards can be generated and displayed by clicking on a hyperlink associated with information about the clients, and an associated review of this information can be a helpful part of planning and preparation for actual sales calls.

FIG. 6 shows a representative distributor scorecard for an individual sales-person "E", and another representative distributor scorecard for another sales-person "S". As shown, the representative sales-parameters that are arranged along the horizontal direction of the matrix-grid are identified as: "All Volume"; "ANR" (Adjusted Net Revenue); "SC" (Sales Contribution); and "Distinctive Volume". Also displayed are the parameters of "Target" and "Actual" performance. In the present disclosure, the term, Sales Contribution, pertains to variable profit. The term, Distinctive Volume pertains to selected products that meet predetermined business criteria. For example, such products may have distinctive shapes, sizes, packaging, price margins or other distinctive features. Such features may, for example, significantly differentiate the products from competitive products. It should be readily appreciated that the particular products that are identified as being within the designation of Distinctive Volume can be operatively determined in accordance with the corresponding business plan, in a manner that is conventional and well known. Additionally, the selected identification may or may not be static, and may or may not change from time to time.

The representative sales-parameters arranged along the vertical direction of the matrix-grid are identified as the sections of: "Wipers"; "Washroom"; "Skin Care"; and "Total". Corresponding Target-values and Actual performance values are displayed in the matrix-cells 76. Additionally, the matrix-cells that include Actual-values are further identified with a graphic indicator. As representatively shown, the graphic indicator can be a background color that has been applied to the individual matrix-cell. As illustrated, the cell background can include a green-color (g), a yellow-color (y) or a red-color (r), as appropriate.

FIGS. 7 and 7A show an aspect in which the scorecard feature can be extended to summary or other compiled data sets that can cover multiple sales persons associated in accordance with one or more sales districts. As illustrated, established metrics or parameters, which are based on sales force activities and sales results, can be shown for multiple time periods in a format that readily indicates acceptable, outstanding, or inadequate performance, and allows convenient and rapid comparison between districts or distributors. The display may, for example, be generated on a formatted Web page or may be exported to a conventional spreadsheet program, such as MICROSOFT EXCEL.

FIG. 7 shows a representative evaluation pertaining to a first, "District A". As illustrated, a first matrix-grid displays an evaluation of the selected "activities" parameters: e.g. (1) Total Calls (total number of visits to end users as well as to distributors); (2) Total End User Calls; (3) Trial Rate (e.g. % of end user calls that result in trial of product); (4) Conversion (e.g. % of end users called upon that order new product); (5) Plan Execution for End Users (the total number of end user calls carried out that were planned at the beginning of the week); (6) Plan Execution for Distributors (the total number of distributor calls carried out that were planned at the beginning of the week); (7) Target Account Focus for End Users (e.g. the percentage of end users called that are ranked as high priority accounts); and (8) Target Account Focus for Distributors (e.g. the percentage of distributors called that are ranked as high priority distributors). As illustrated, the first matrix provides Per Seller Averages for District A for selected time periods. Additionally, a related, second matrix-grid displays an evaluation of the selected "results" parameters: e.g. "All Volume"; "ANR" (Adjusted Net Revenue); "SC" (Sales Contribution variable profit); and "Distinctive Volume".

As illustrated, corresponding Target-values and Actual performance values can be displayed in the appropriate matrix-cells. Additionally, the matrix-cells that include actual-values are further identified with a graphic indicator. The employed graphic indicator can desirably be a background color that has been applied to the individual matrix-cell. As illustrated, the cell background can include a green-color (g), a yellow-color (y) or a red-color (r), as appropriate. FIG. 7A is similar to FIG. 7, but is configured to show an evaluation of a different district or sales-group; e.g. "District B".

FIG. 8 shows a portion of a screen shot from an embodiment of the FACT tool showing one way in which appointments can be displayed for a particular sales person for a particular week. The information can, for example, be displayed in a Web browser. One column shows the date and time of the appointment. The next column indicates the company, with the illustrated information being blurred to generally represent the data that would be specific to a particular company or client). The next column shows the name of the contact (also blurred to provide a general representation). Then two columns provide codes describing the type and objective of the call. Further columns that follow pertain to additional information; such as the date and time logged, outcome, reason for the outcome, and an option to update the sales call information. Hyperlinks can provide further details behind the data displayed. In the shown arrangement, the following abbreviations are interpreted as follows: "DIs"=distributor; "ACT"=target account; "DSR"=district sales representative; "ACR"=acquire.

FIG. 9 is a screen shot of a section of the FACT tool for updating the FACT database for a hypothetical company. The various fields displayed show how information pertaining to a call can be entered into the sales force database, and the archived information can be used for subsequent planning or report generation.

Other aspects of the sales force automation system and method 30 can be configured to provide instructions which operatively direct the computer system 100 to operatively employ a set of client-selection parameters 78 to assess or select at least one priority-client. The employed set of parameters can include one or more client-selection parameters. Instructions can also be provided to operatively direct the computer system to compile and analyze the sorted input-values to generate a client-performance-value for each client-selection parameter for an individual client. It should be readily appreciated that this client-performance-value can be derived from the previously described input-information that has been compiled according to the "values" of the input-information that have been gathered, sorted, evaluated and/or otherwise processed according to the selected client. It should also be readily appreciated that the client-performance-values can be operatively compiled, generated, calculated or otherwise processed in accordance with any selected time period.

Figure 10:
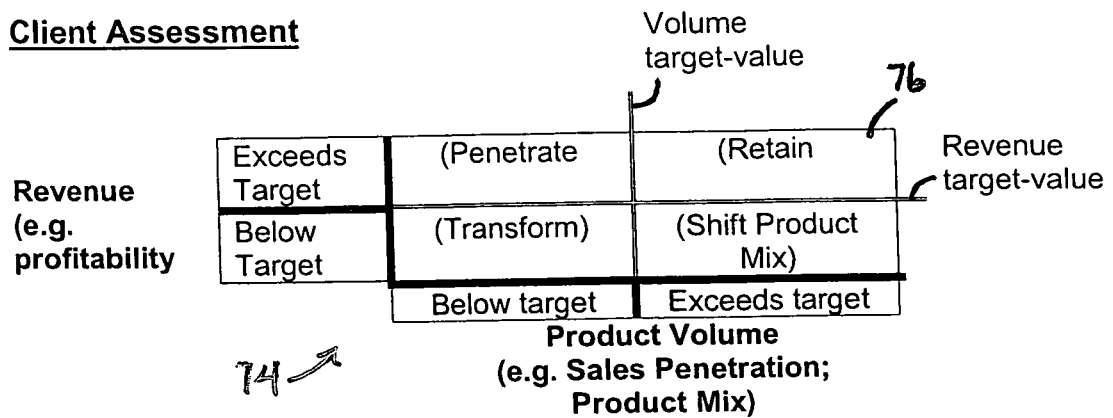
FIG. 10 shows a representative matrix-grid that can be employed to assess a client.

With other instructions, each client-selection-parameter can be provided with a corresponding weighting-factor, such as an operative numerical-multiplier. With further instructions, the client-selection parameters can also be arranged or sorted into a first-set of client-selection parameters, and at least a second-set of client-selection parameters. With reference to FIG. 10, for example, the first-set of parameters may include a set of revenue-related parameters, and the second-set of parameters may include a set of volume-related parameters that pertain to the sales-volumes of one or more products or product categories. The revenue-related parameters can be any operative parameter pertaining to revenue. For example, the revenue-related parameters can include Sales Contribution (SC), which pertains to variable profit, Adjusted Net Revenue (ANR), and/or other operative revenue-parameters. The volume-related parameters can, for example, include one or more categories of product. With respect to the wipes product, for example, there can be several categories of wipes, and the categories may represent high, low, and medium sections of the wipes, product-line. Similarly, there may be categories of washroom products, categories of skin-care products, and categories of other product-lines.

For each client-selection parameter, the system and method can also provide instructions to take its obtained client-performance-value, and process such value by its corresponding weighting-factor; to thereby obtain a weighted-value with respect to its corresponding client-selection parameter. As mentioned previously, the various arrangements of the system and method can be configured to process the weighting-factor in any operative manner. For example, the weighting-factor may be processed in accordance with a selected mathematic formula or operation. In a desired arrangement, for example, the obtained client-performance-value can be multiplied by its corresponding weighting-factor to thereby obtain the corresponding weighted-value.

Additionally, the resulting weighted-values can be further processed to obtain a first composite value for the first-set of client-parameters, and a second composite value for the second-set of client-parameters.

For example, all of the weighted-values for the first-set of client-selection parameters can be summed together. Additionally, a selected average (e.g. an arithmetic-average) of the weighted-values can be taken with regard to the first-set of parameters to obtain a first prioritization-value. The computer system can also be instructed to provide the first-set of client-selection parameters with an overall, first prioritization target-value, and to provide the first-set of client-selection parameters with a corresponding series of prioritization-ratings. For example, the performance-ratings can include rankings, such as "below target", "meets target", "exceeds target", and the like.

The system and method can also provide instructions which operatively direct the computer system to compare the first prioritization-value for the first set of client-selection parameters to its corresponding first prioritization target-value. Upon such comparison between the first prioritization-value and its corresponding first prioritization target-value, instructions can be provided to operatively direct the computer system to determine the appropriate first prioritization-rating.

With respect to the second-set of client-selection parameters, all of the weighted-values for this second-set of parameters may also be summed together. Additionally, a selected average (e.g. arithmetic-average) of the weighted-values can be taken to obtain a second prioritization-value. The computer system can be further instructed to provide the second-set of client-selection parameters with an overall, second prioritization target-value, and to provide the second-set of client-selection parameters with a corresponding series of prioritization-ratings. For example, the performance-ratings can include rankings, such as "below target", "meets target", "exceeds target", and the like.

Instructions provided by the system and method 30 can then operatively direct the computer system to compare the second prioritization-value for the second-set of client-selection parameters to its corresponding second prioritization target-value. Upon such comparison between the second prioritization-value for the second-set of client-selection parameters and its corresponding second prioritization target-value, providing instructions which operatively direct the computer system to determine the appropriate second prioritization-rating.

In a desired aspect, instructions in the system and method 30 can direct the computer system 100 to provide a matrix-grid 74 display of cells 76 wherein the first prioritization-ratings are considered or evaluated along a first axis, and the second prioritization ratings are considered or evaluated along a second axis. As representatively shown in FIG. 10, for example, the first axis may be aligned along a generally horizontal direction, and the second axis may be aligned along a generally vertical direction. Each cell 76 of the matrix-grid display can be positioned at an intersection of a horizontal row and a vertical column, and can represent a selected matrix-combination of the determined first prioritization-rating and the determined, second prioritization-rating.

For example, the sales force automation system and method can have a configuration in which the first prioritization-rating is operatively related to a first-set of client-selection parameters, and in which the first-set of client-selection parameters include one or more revenue-parameters. In particular arrangements, the set of revenue-related parameters can include at least a net-revenue parameter and/or a profit-parameter. The second prioritization-rating can be operatively related to a second-set of client-selection parameters, and the second-set of client-selection parameters may include one or more product-volume parameters. In further aspects, the volume parameters may be expressed in terms of monetary (e.g. dollar) value, or in terms of a number of "cases" or other convenient inventory units. The volume parameters may be associated with a level of sales penetration attained by a mix of products sold to the client.

The system and method may also provide instructions which operatively direct the computer system to operatively designate the cell of the matrix-grid that corresponds to the combination of the determined, first prioritization-rating and the determined, second prioritization-rating regarding the selected individual client. For example, the designation may include an X-mark or other suitable designator.

Additionally, instructions can be provided to operatively direct the computer system to provide a series of matrix-ratings. For example, the matrix-ratings representatively shown in FIG. 10 include the ratings of "Transform", "Penetrate", "Shift product mix" and "Retain". Such ratings may be particularly pertinent to existing customers or other existing clients. With regard to prospective new customers or clients, the rating "Acquire" may be applied. Another aspect of the system and method may include instructions to operatively direct the computer system to provide a corresponding matrix-rating for one or more cells of the matrix-grid display. Still another aspect, may include instructions to operatively direct the computer system to provide instructions which operatively direct the computer system to provide a corresponding graphical indicator for each matrix-rating. Further features of the system and method can provide instructions which operatively direct the computer system to display the graphical indicator that corresponds to the matrix-rating of the designated-cell of the matrix-grid that corresponds to the combination of the first prioritization-rating and the second prioritization-rating that have been determined for the selected, individual client.

To generate the assessment illustrated in FIG. 10, the following, representative procedure may be employed. The Revenue section can be configured to include the revenue-parameter Sales Contribution (SC), which pertains to profitability. Additionally, the Revenue target-value can be selected to be 45% of ANR (Adjusted Net Revenue), or any other value that is determined to be significant and consistent with the corresponding business plan.

The Product Volume section can be configured to include one or more categories of one or more individual product-lines. For example, the Product Volume section may include one or more categories of Wipes, one or more categories of Washroom Products, one or more categories of Skincare Products, and the like. The Volume target-value can be any operative value that may be determined in accordance with the corresponding business plan. In the representatively shown assessment, for example, the selected Volume target-value can be a level at which a client purchases four different categories of any combination of product-lines. It should be readily appreciated that the selection of the Volume target-value can be suitably determined in accordance with the corresponding business plan, in a manner that is conventional and well known. Additionally, the selected Volume target-value may or may not be static, and may or may not change from time to time.

The client-assessment aspects of the system and method 30 can be employed to more readily identify high-priority customers and clients. It should be appreciated that in various business situations, the high-priority client may fall into any one the client-assessment ratings (e.g. the ratings of "Transform", "Penetrate", "Shift product mix", "Retain", and "Acquire"). It should be readily appreciated that the particular rating that is identified as being "high-priority" can be operatively determined in accordance with the corresponding business plan, in a manner that is conventional and well known. Accordingly, the particular client-assessment rating that is selectively identified as being "high-priority" may be dynamic or static, and may or may not change from time to time.

In its various aspects and configurations, the database and system architecture of the system and method 30 can be readily adapted or configured to operatively interface with SAP software (SAP America, Inc.) or other enterprise software systems, allowing sales force data, for example, to be readily integrated with operations, financial systems, and other tools. The system can build on or include known software tools and programming methods for sales force staff, including those disclosed in EP 1 244 042 A1, entitled "System for and Method of Facilitating Sales Activities," and published Sep. 25, 2002 by Ikezawa et al., the entire disclosure of which is hereby incorporated by reference in a manner that is consistent herewith.

Integration of the software with other software systems can be done using known software development tools provided by Microsoft and other vendors. For example, integration with MICROSOFT OUTLOOK, MICROSOFT EXCEL, and MICROSOFT WORD is possible, and has been demonstrated, for example, with Sales Force Automation software by SalesForce.com (see, for example, http://www.salesforce.com/products/office.jsp, as viewed Jun. 1, 2006).

Details of system architecture for sales force automation tools and associated databases and list generation methods are disclosed in U.S. Patent Application 2002/0040358 A1, entitled SALES MANAGEMENT SYSTEM AND METHOD THEREOF, which was published Apr. 4, 2002 by Ikezawa and Koide, and is herein incorporated by reference in a manner that is consistent herewith. U.S. Patent Application Publication 2002/0040358 A1 discloses a sales force automation (SFA) server that stores a customer database. The customer database stores a customer name and/or staff name of the corresponding customer; a business transaction of the customer; detail information representing business activities for achieving the business transaction, a completion scheduled date, and an actual completion date; information for determining whether each maturity stage has been attained; a check flag representing whether a maturity item has been attained, and a strategic scenario showing some plans for the business transaction toward the customer or other client. Each sales-staff terminal inputs the above data, stores the input data, and displays the detail information of the business activities in chronological order of the scheduled dates in the form of a list. The displayed data can be viewed from a manager terminal as well. An SCM (Service Center Management) server can estimate the demand for products, based on the check flag stored in the customer or client database. Such a system can be further extended to incorporate the tools of the present invention, including the graphical user interface that allows a rapid comparison of activities behaviors with activity goals, and sales results with sales goals.

The present invention can also be used with, combined with, or incorporated into systems for tracking sales and handling financial aspects of sales force management, such as the system disclosed in U.S. Patent Application Publication 2002/0188535 A1 entitled METHOD AND APPARATUS FOR PROCESSING SALES TRANSACTION DATA by D. Chao et al. which was published on Dec. 12, 2002 and is hereby incorporated by reference in a manner that is consistent herewith.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

The invention claimed is:

1. A method comprising:
   receiving one or more activity parameters indicating at least one of total calls, total end user calls, trial rate, conversion rate, plan execution for end users, plan execution for distributors, target account focus for end users, or target account focus for distributors;
   receiving a weighting factor and a target activity value for the received one or more activity parameters, each target activity value associated with one of a plurality of performance levels;
   receiving customer data related to customer interactions with respective members of a sales force wherein the customer data indicates which of the one or more activity parameters were performed by each of the respective members of the sales force;
   determining a performance value for the received one or more activity parameters for a particular member of the sales force, said determining based at least in part on the customer data;
   comparing the performance values for the received activity parameters to the respective target activity value;
   determining, by a computing system having one or more computer processors, performance scores for the received one or more activity parameters for the particular member of the sales force, the performance scores based at least partly on said comparing of the performance values, said weighting factor for the associated activity parameter, and the one or more activity parameters that were performed by the particular member of the sales force;
   determining, by the computing system, one of the plurality of performance levels for the received activity parameters based at least in part on the respective performance scores; and
   generating, by the computing system, a report including performance scores for the particular member of the sales force and performance levels associated with respective performance scores, wherein the performance levels are indicated by graphical indications.

2. The method of claim 1, wherein the plurality of performance levels comprise a first level associated with a weight of 0%, a second level associated with a weight of 50%, and a third level associated with a weight of 100%.

3. The method of claim 1, further comprising:
   determining a ranking for the particular member of the sales force, the ranking based at least partly on the overall score for the particular member, the ranking corresponding to performance of the particular member of the sales force relative to other members of the sales force.

4. The method of claim 1, wherein the target account focus for distributors indicates an amount of distributor-interactions with high priority distributors relative to a total number of distributor-interactions.

5. The method of claim 1, wherein the plan execution for distributors indicates an amount of distributor-interactions with high priority distributors for a time period relative to a number of planned distributor-interactions for the time period.

6. The method of claim 1, wherein the target account focus for end users indicates an amount of customer-interactions with high priority customers relative to a total number of customer-interactions.

7. The method of claim 1, wherein the trial rate indicates a number of customer-interactions resulting in a trial of a product relative to a total number of customer-interactions.

8. The method of claim 1, wherein the conversion rate indicates a number of customer-interactions resulting in an order of a product relative to a total number of customer-interactions.

9. The method of claim 1, further comprising:
   receiving a target organizational score and one or more of the activity parameters for the target organizational score; and
   generating an organizational score based on the performance scores for members of the sales force.

10. A computing system comprising:
    one or more computer processors configured to cause the computing system to:
       receive one or more activity parameters indicating at least one of total calls, total end user calls, trial rate, conversion rate, plan execution for end users, plan execution for distributors, target account focus for end users, or target account focus for distributors;
       receive a weighting factor and a target activity value the received one or more activity parameters, each target activity value associated with one of a plurality of performance levels;
       receive customer data related to customer interactions with respective members of a sales force wherein the customer data indicates which of the one or more activity parameters were performed by each of the respective members of the sales force;
       determine a performance value for the received one or more activity parameters for a particular member of the sales force, said determining based at least in part on the customer data;
       compare the performance values for the received activity parameters to the respective target activity value;
       determine performance scores for the received one or more activity parameters for the particular member of the sales force, the performance scores based at least partly on said comparison of the performance values, said weighting factor for the associated activity parameter, and the one or more activity parameters that were performed by the particular member of the sales force;
       determine one of the plurality of performance levels for the received activity parameters based at least in part on the respective performance scores; and
       generate a report including performance scores for the particular member of the sales force and performance levels associated with respective performance scores, wherein the performance levels are indicated by graphical indications.

11. The computing system of claim 10, wherein the plurality of performance levels comprise a first level associated with a weight of 0%, a second level associated with a weight of 50%, and a third level associated with a weight of 100%.

12. The computing system of claim 10, wherein the computing system is configured to determine a ranking for the particular member of the sales force, the ranking based at least partly on the overall score for the particular member, the ranking corresponding to performance of the particular member of the sales force relative to other members of the sales force.

13. The computing system of claim 10, wherein the target account focus for distributors indicates an amount of distributor-interactions with high priority distributors relative to a total number of distributor-interactions.

14. The computing system of claim 10, wherein the plan execution for distributors indicates an amount of distributor-interactions with high priority distributors for a time period relative to a number of planned distributor-interactions for the time period.

15. The computing system of claim 10, wherein the computing system is further configured to:
receive a target organizational score and one or more of the activity parameters for the target organizational score; and
generate an organizational score based on the performance scores for members of the sales force.

16. A non-transitory computer-readable medium having stored thereon instructions that, in response to execution by a computing system, cause the computing system to perform operations comprising:
receiving one or more activity parameters indicating at least one of total calls, total end user calls, trial rate, conversion rate, plan execution for end users, plan execution for distributors, target account focus for end users, or target account focus for distributors;
receiving a weighting factor and a target activity value for the received one or more the received activity parameters, each target activity value associated with one of a plurality of performance levels;
receiving customer data related to customer interactions with respective members of a sales force wherein the customer data indicates which of the one or more activity parameters were performed by each of the respective members of the sales force;
determining a performance value for the received one or more activity parameters for a particular member of the sales force, said determining based at least in part on the customer data;
comparing the performance values for the received activity parameters to the respective target activity value;
determining performance scores for the received one or more activity parameters for the particular member of the sales force, the performance scores based at least partly on said comparing of the performance values, said weighting factor for the associated activity parameter, and the one or more activity parameters that were performed by the particular member of the sales force;
determining, by the computing system, one of the plurality of performance levels for the received activity parameters based at least in part on the respective performance scores; and
generating a report including performance scores for the particular member of the sales force and performance levels associated with respective performance scores, wherein the performance levels are indicated by graphical indications.

17. The non-transitory computer-readable medium of claim 16, wherein the plurality of performance levels comprise a first level associated with a weight of 0%, a second level associated with a weight of 50%, and a third level associated with a weight of 100%.

18. The non-transitory computer-readable medium of claim 16, said instructions causing the computer system to perform further operation:
receiving a target organizational score and one or more of the activity parameters for the target organizational score; and
generating an organizational score based on the performance scores for members of the sales force.

* * * * *